(12) United States Patent
Jones et al.

(10) Patent No.: US 9,513,498 B2
(45) Date of Patent: Dec. 6, 2016

(54) DETECTOR REMODULATOR

(71) Applicant: Rockley Photonics Limited, Marlborough Wiltshire (GB)

(72) Inventors: Haydn Frederick Jones, Reading (GB); Andrew Rickman, Marlborough (GB); Aaron John Zilkie, Pasadena, CA (US)

(73) Assignee: Rockley Photonics Limited, London (GB)

(*) Notice: Subject to any disclaimer, the term of this patent is extended or adjusted under 35 U.S.C. 154(b) by 11 days.

(21) Appl. No.: 14/629,922

(22) Filed: Feb. 24, 2015

(65) Prior Publication Data
US 2015/0277157 A1    Oct. 1, 2015

(30) Foreign Application Priority Data
Feb. 24, 2014    (GB) .................... 1403191.8

(51) Int. Cl.
| | | |
|---|---|---|
| G02F 1/035 | (2006.01) | |
| G02F 1/025 | (2006.01) | |
| H04B 10/29 | (2013.01) | |
| G02F 2/00 | (2006.01) | |
| G02B 6/42 | (2006.01) | |
| G02B 6/43 | (2006.01) | |
| G02F 1/225 | (2006.01) | |

(Continued)

(52) U.S. Cl.
CPC ............ *G02F 1/025* (2013.01); *G02B 6/4295* (2013.01); *G02B 6/43* (2013.01); *G02F 1/2257* (2013.01); *G02F 2/004* (2013.01); *H04B 10/29* (2013.01); *G02F 2001/0151* (2013.01); *G02F 2001/212* (2013.01); *G02F 2002/008* (2013.01)

(58) Field of Classification Search
CPC ....................................................... G02F 1/025
See application file for complete search history.

(56) References Cited

U.S. PATENT DOCUMENTS

| | | |
|---|---|---|
| 5,438,444 A | 8/1995 | Tayonaka et al. |
| 5,757,986 A | 5/1998 | Crampton et al. |

(Continued)

FOREIGN PATENT DOCUMENTS

| | | |
|---|---|---|
| EP | 0 310 058 A2 | 4/1989 |
| EP | 1 761 103 A1 | 3/2007 |

(Continued)

OTHER PUBLICATIONS

"40Gb/s 2R Optical Regenerator (wavelength converter)", CIP Technologies, Preliminary Datasheet, Nov. 2013, 2 pages.

(Continued)

*Primary Examiner* — Rhonda Peace
(74) *Attorney, Agent, or Firm* — Lewis Roca Rothgerber Christie LLP

(57) ABSTRACT

A detector remodulator comprising a silicon on insulator (SOI) waveguide platform including: a detector coupled to a first input waveguide; a modulator coupled to a second input waveguide and an output waveguide; and an electrical circuit connecting the detector to the modulator; wherein the detector, modulator, second input waveguide and output waveguide are arranged within the same horizontal plane as one another; and wherein the modulator includes a modulation waveguide region at which a semiconductor junction is set horizontally across the waveguide.

27 Claims, 15 Drawing Sheets

(51) Int. Cl.
*G02F 1/015* (2006.01)
*G02F 1/21* (2006.01)

(56) References Cited

U.S. PATENT DOCUMENTS

| | | | |
|---|---|---|---|
| 5,908,305 A | 6/1999 | Crampton et al. | |
| 6,298,177 B1 | 10/2001 | House | |
| 6,349,106 B1* | 2/2002 | Coldren | B82Y 20/00 372/26 |
| 6,445,839 B1* | 9/2002 | Miller | B82Y 20/00 359/248 |
| 6,549,313 B1 | 4/2003 | Doerr et al. | |
| 6,563,627 B2 | 5/2003 | Yoo | |
| 6,580,739 B1 | 6/2003 | Coldren | |
| 6,584,239 B1 | 6/2003 | Dawnay et al. | |
| 6,614,819 B1 | 9/2003 | Fish et al. | |
| 6,680,791 B2* | 1/2004 | Demir | B82Y 20/00 359/245 |
| 6,710,911 B2 | 3/2004 | LoCascio et al. | |
| 6,873,763 B2 | 3/2005 | Nikonov | |
| 7,092,609 B2* | 8/2006 | Yegnanarayanan | G02F 1/025 385/131 |
| 7,133,576 B2 | 11/2006 | Coldren et al. | |
| 7,256,929 B1 | 8/2007 | Rong et al. | |
| 7,394,948 B1 | 7/2008 | Zheng et al. | |
| 7,570,844 B2 | 8/2009 | Handelman | |
| 7,603,016 B1 | 10/2009 | Soref | |
| 7,811,844 B2* | 10/2010 | Carothers | H01L 27/0617 257/347 |
| 7,826,700 B2 | 11/2010 | Knights et al. | |
| 7,941,014 B1 | 5/2011 | Watts et al. | |
| 8,160,404 B2 | 4/2012 | Pan et al. | |
| 8,242,432 B2 | 8/2012 | Feng et al. | |
| 8,346,028 B2 | 1/2013 | Feng et al. | |
| 8,401,385 B2 | 3/2013 | Spivey et al. | |
| 8,403,571 B2 | 3/2013 | Walker | |
| 8,792,787 B1 | 7/2014 | Zhao et al. | |
| 2003/0063362 A1* | 4/2003 | Demir | B82Y 20/00 359/240 |
| 2003/0133641 A1 | 7/2003 | Yoo | |
| 2003/0142943 A1* | 7/2003 | Yegnanarayanan | G02F 1/025 385/131 |
| 2004/0207016 A1* | 10/2004 | Patel | G02B 6/12004 257/347 |
| 2006/0140528 A1 | 6/2006 | Coldren et al. | |
| 2006/0257065 A1 | 11/2006 | Coldren et al. | |
| 2009/0003841 A1 | 1/2009 | Ghidini et al. | |
| 2009/0169149 A1 | 7/2009 | Block | |
| 2009/0245298 A1 | 10/2009 | Sysak et al. | |
| 2010/0128336 A1 | 5/2010 | Witzens et al. | |
| 2010/0200733 A1 | 8/2010 | McLaren et al. | |
| 2010/0290732 A1* | 11/2010 | Gill | B29D 11/00663 385/3 |
| 2011/0142391 A1 | 6/2011 | Asghari et al. | |
| 2011/0180795 A1 | 7/2011 | Lo et al. | |
| 2011/0293279 A1 | 12/2011 | Lam et al. | |
| 2012/0328292 A1 | 12/2012 | Testa et al. | |
| 2013/0051798 A1 | 2/2013 | Chen et al. | |
| 2013/0315599 A1 | 11/2013 | Lam et al. | |
| 2015/0277157 A1* | 10/2015 | Jones | G02F 1/025 385/3 |

FOREIGN PATENT DOCUMENTS

| WO | WO 02/41663 A2 | 5/2002 |
|---|---|---|
| WO | WO 2008/024458 A2 | 2/2008 |

OTHER PUBLICATIONS

Bregni, Stefano et al., "Architectures and Performance of AWG-Based Optical Switching Nodes for IP Networks", IEEE Journal on Selected Areas in Communications, Sep. 2003, pp. 1113-1121, vol. 21, No. 7.

Dong, Po et al., "Wavelength-tunable silicon microring modulator", Optics Express, May 10, 2010, pp. 10941-10946, vol. 18, No. 11.
Durhuus, Terji et al., "All-Optical Wavelength Conversion by Semiconductor Optical Amplifiers", Journal of Lightwave Technology, Jun. 1996, pp. 942-954, vol. 14, No. 6.
Edagawa, Noboru et al., "Novel Wavelength Converter Using an Electroabsorption Modulator", IEICE Trans. Electron., Aug. 1998, pp. 1251-1257, vol. E81-C, No. 8.
Ellis, A.D. et al., "Error free 100Gbit/s wavelength conversion using grating assisted cross-gain modulation in 2mm long semiconductor amplifier", Electronics Letters, Oct. 1, 1998, pp. 1958-1959, vol. 34, No. 20.
Feng, Dazeng et al., "High-Speed GeSi Electroabsorption Modulator on the SOI Waveguide Platform", IEEE Journal of Selected Topics in Quantum Electronics, Nov./Dec. 2013, 10 pages, vol. 19, No. 6.
Fidaner, Onur et al., "Integrated photonic switches for nanosecond packet-switched optical wavelength conversion", Optics Express, Jan. 9, 2006, pp. 361-368, vol. 14, No. 1.
Fidaner, Onur et al., "Waveguide Electroabsorption Modulator on Si Employing Ge/SiGe Quantum Wells", Optical Society of America, 2007, 1 page.
Foster, Mark A., "Broad-band continuous-wave parametric wavelength conversion in silicon nanowaveguides", Optics Express, Sep. 24, 2007, pp. 12949-12958, vol. 15, No. 20.
Geis, M.W. et al., "Silicon waveguide infrared photodiodes with >35 GHz bandwidth and phototransistors with 50 AW$^{-1}$ response", Optics Express, Mar. 18, 2009, pp. 5193-5204, vol. 17, No. 7.
Gripp, Jürgen et al., "Optical Switch Fabrics for Ultra-High-Capacity IP Routers", Journal of Lightwave Technology, Nov. 2003, pp. 2839-2850, vol. 21, No. 11.
Hsu, A. et al., "Wavelength Conversion by Dual-Pump Four-Wave Mixing in an Integrated Laser Modulator", IEEE Photonics Technology Letters, Aug. 2003, pp. 1120-1122, vol. 15, No. 8.
Hu, Hao et al., "Ultra-high-speed wavelength conversion in a silicon photonic chip", Optics Express, Sep. 26, 2011, pp. 19886-19894, vol. 19, No. 21.
Hussain, Ashiq et al., "Optimization of Optical Wavelength Conversion in SOI Waveguide", Applied Mechanics and Materials, 2012, 5 pages, vol. 110-116.
International Search Report and Written Opinion of the International Searching Authority, Dated Jun. 8, 2015, Mailed Jun. 15, 2015, and Received Jun. 15, 2015, Corresponding to PCT/GB2015/050523, 14 pages.
International Search Report and Written Opinion of the International Searching Authority, Dated Jun. 8, 2015, Mailed Sep. 16, 2015, and Received Sep. 17, 2015, Corresponding to PCT/GB2015/050524, 18 pages.
Kachris, Christoforos et al., "Optical Interconnection Networks in Data Centers: Recent Trends and Future Challenges", IEEE Communications Magazine, Optical Technologies for Data Center Networks, Sep. 2013, pp. 39-45.
Lal, Vikrant et al., "Monolithic Wavelength Converters for High-Speed Packet-Switched Optical Networks", IEEE Journal of Selected Topics in Quantum Electronics, Jan./Feb. 2007, pp. 49-57, vol. 13, No. 1.
Leuthold, J. et al., "All-optical wavelength conversion between 10 and 100 Gb/s with SOA delayed-interference configuration", Optical and Quantum Electronics, 2001, pp. 939-952, vol. 33, Nos. 7-10.
Liao, Ling et al., "High speed silicon Mach-Zehnder modulator", Optics Express, Apr. 18, 2005, pp. 3129-3135, vol. 13, No. 8.
Liu, Ansheng et al., "High-speed optical modulation based on carrier depletion in a silicon waveguide", Optics Express, Jan. 22, 2007, pp. 660-668, vol. 15, No. 2.
Liu, Y. et al., "Error-Free 320-Gb/s All-Optical Wavelength Conversion Using a Single Semiconductor Optical Amplifier", Journal of Lightwave Technology, Jan. 2007, pp. 103-108, vol. 25, No. 1.
Maxwell, G. et al., "WDM-enabled, 40Gb/s Hybrid Integrated All-optical Regenerator", ECOC 2005 Proceedings, 2005, pp. 15-16, vol. 6.
Meuer, Christian et al., "80 Gb/s wavelength conversion using a quantum-dot semiconductor optical amplifier and optical filtering", Optics Express, Mar. 3, 2011, pp. 5134-5142, vol. 19, No. 6.

(56) References Cited

OTHER PUBLICATIONS

Nakamura, Shigeru et al., "168-Gb/s All-Optical Wavelength Conversion With a Symmetric-Mach-Zehnder-Type Switch", IEEE Photonics Technology Letters, Oct. 2001, pp. 1091-1093, vol. 13, No. 10.

Neilson, David T., "Photonics for Switching and Routing", IEEE Journal of Selected Topics in Quantum Electronics, Jul./Aug. 2006, pp. 669-678, vol. 12, No. 4.

Ngo, Hung Q. et al., "Constructions and Analyses of Nonblocking WDM Switches Based on Arrayed Waveguide Grating and Limited Wavelength Conversion", IEEE/ACM Transactions on Networking, Feb. 2006, pp. 205-217, vol. 14, No. 1.

Ngo, Hung Q. et al, "Nonblocking WDM Switches Based on Arrayed Waveguide Grating and Limited Wavelength Conversion", Proceedings from the 23rd Conference of the IEEE Communications Society, 2004, 11 pages.

Nishimura, Kohsuke et al., "Optical wavelength conversion by electro-absorption modulators", Active and Passive Optical Components for WDM Communications IV, Proceedings of SPIE, 2004, pp. 234-243, vol. 5595.

"Quad 40Gb/s 2R Optical Regenerator", CIP Technologies, Preliminary Datasheet, Nov. 2013, 2 pages.

Reed, Graham T. et al., "Silicon optical modulators", Materials Today, Jan. 2005, pp. 40-50, vol. 8, No. 1.

Segawa, Toru et al., "All-optical wavelength-routing switch with monolithically integrated filter-free tunable wavelength converters and an AWG", Optics Express, Feb. 17, 2010, pp. 4340-4345, vol. 18, No. 5.

Stamatiadis, C. et al., "Fabrication and experimental demonstration of the first 160 Gb/s hybrid silicon-on-insulator integrated all-optical wavelength converter", Optics Express, Feb. 1, 2012, pp. 3825-3831, vol. 20, No. 4.

Stubkjaer, Kristian E., "Semiconductor Optical Amplifier-Based All-Optical Gates for High-Speed Optical Processing", IEEE Journal on Selected Topics in Quantum Electronics, Nov./Dec. 2000, pp. 1428-1435, vol. 6, No. 6.

Summers, Joseph A. et al., "Monolithically Integrated Multi-Stage All-Optical 10Gbps Push-Pull Wavelength Converter", Optical Fiber Communication Conference, 2007, 3 pages, Anaheim, CA, USA.

Sysak, M.N. et al., "Broadband return-to-zero wavelength conversion and signal regeneration using a monolithically integrated, photocurrent-driven wavelength converter", Electronics Letters, Dec. 7, 2006, 2 pages, vol. 42, No. 25.

Tauke-Pedretti, Anna et al., "Separate Absorption and Modulation Mach-Zehnder Wavelength Converter", Journal of Lightwave Technology, 2008, pp. 1-8, vol. 26, No. 1.

Turner-Foster, Amy C. et al., "Frequency conversion over two-thirds of an octave in silicon nanowaveguides", Optics Express, Jan. 15, 2010, pp. 1904-1908, vol. 18, No. 3.

U.K. Intellectual Property Office Search Report, Dated Aug. 6, 2014, Received Aug. 8, 2014, for Patent Application No. GB1403191.8, 5 pages.

U.K. Intellectual Property Office Search Report, Dated Sep. 5, 2014, Received Sep. 10, 2014, for Patent Application No. GB1403191.8, 2 pages.

U.K. Intellectual Property Office Search Report, Dated Jun. 10, 2015, Received Jun. 12, 2015, for Patent Application No. GB1420063.8, 4 pages.

U.S. Appl. No. 14/827,200, filed Aug. 14, 2015.

Vivien, L. et al., "High speed silicon modulators and detectors", ACP Technical Digest, Communications and Photonics Conference, Nov. 7, 2012, 3 pages.

Vlachos, Kyriakos et al., "Photonics in switching: enabling technologies and subsystem design", Journal of Optical Networking, May 2009, pp. 404-428, vol. 8, No. 5.

Wang, J. et al., "Evanescent-Coupled Ge p-i-n Photodetectors on Si-Waveguide With SEG-Ge and Comparative Study of Lateral and Vertical p-i-n Configurations", IEEE Electron Device Letters, May 2008, pp. 445-448, vol. 29, No. 5.

Yao, Shun et al., "A Unified Study of Contention-Resolution Schemes in Optical Packet-Switched Networks", Journal of Lightwave Technology, 2003, 31 pages, vol. 21, No. 3.

Ye, Tong et al., "AWG-based Non-blocking Clos Networks", Aug. 21, 2013, pp. 1-13.

\* cited by examiner

DETECTOR REMODULATOR

FIELD OF THE INVENTION

The present invention relates to a detector remodulator, more particularly to a detector remodulator comprising a silicon on insulator (SOI) waveguide platform.

BACKGROUND OF THE INVENTION

In optical communications and optical switching it is well known that signals can be transposed from a first optical signal of a first channel or wavelength to a second optical signal of a second channel or wavelength.

A detector remodulator may be used to convert the first optical signal to the second optical signal and involves the detection of the first signal in which the first (modulated) signal is converted into an electrical signal, followed by the modulation of light of a second (unmodulated) wavelength/channel by the (modulated) electrical signal. Whilst in the electrical domain, the signal may advantageously be processed, for example by one or more of amplification, reshaping, re-timing, and filtering in order to provide a clean signal to be applied to the second wavelength/channel. However, currently in the art, to amplify and filter the electrical signal at high data rates with low noise, the circuitry must be contained in a separate electronic chip, which requires packaging and mounting thereby increasing size and cost and reducing power efficiency.

In U.S. Pat. No. 6,680,791 an integrated chip is provided with a light detector and modulator positioned close together so that the electrical connection between the detector part and the modulator part is short and of low resistivity. However a maximum of only 10 Gb/s data speed is predicted for this structure due to diode capacitance and thin-film resistance limitations [O. Fidaner et al., Optics Express, vol. 14, pp. 361-368, (2006)].

U.S. Pat. No. 6,349,106 describes a tunable laser, driven by a circuit with a signal derived from a first optical wavelength. However because it comprises a III-V-material photonic integrated circuit and involves the use of epitaxial heterostructures and a vertical p-i-n diode structure, is inflexible in its design and therefore inadequate for new applications involving increasing switching speeds, reduced latency, reduced power consumption and the demand for lower cost and high-yield manufacturability. In particular, because the semiconductor devices including the modulator built upon the semiconductor chip are driven by circuits completed between contacts on the top surface and a contact covering all or a large proportion of the base or underside of the chip, the capacitance of the device cannot be readily controlled by design features built into the structures such as doped regions and metal contacts.

SUMMARY OF THE INVENTION

The present invention aims to address these problems by providing, according to a first aspect, a detector remodulator comprising a silicon on insulator (SOI) waveguide platform including: a detector coupled to a first input waveguide; a silicon/germanium (SiGe) or homogeneous silicon (Si) modulator coupled to a second input waveguide and an output waveguide; and an electrical circuit connecting the detector to the modulator; wherein the detector, modulator, second input waveguide and output waveguide are arranged within the same horizontal plane as one another; and wherein the modulator includes a modulation waveguide region, or "modulation region", at which a semiconductor junction is set horizontally across the waveguide.

The modulation region may be a phase modulation region or an amplitude modulation region.

The horizontal plane should be understood to be any plane parallel to the plane of the substrate surface. The semiconductor junction should be understood to correspond to any one junction or number of junctions between different regions having different semiconductor Fermi energies thereby forming an opto-electronic region. The semiconductor junction may or may not include an intrinsic region.

The semiconductor junction is horizontal in that the junction is formed by a first doped region at (and/or extending into) one side of the waveguide and a second doped region at (and/or extending into) the opposite side of the waveguide. All doped regions of the semiconductor junction therefore lie along the horizontal plane defined by the detector, modulator, second input and output waveguides.

The planar arrangement of the detector remodulator, and in particular the horizontal junction, enables increased flexibility in both design and fabrication as the location of doped sections at either side of the waveguide rather than above or below the waveguide gives rise to a greater degree of freedom in terms of their size and shape.

The horizontal junction configuration also enables easy access to each of the junction regions. This is particularly useful where the junction includes an intrinsic region (or a third doped region) between two doped regions as it enables electrodes corresponding to each of the three regions to be positioned on top of the respective region.

As the detector remodulator of this invention has a horizontal junction configuration, properties such as size of the doped regions can easily be adapted and controlled during design and manufacture, parameters such as capacitance that crucially affect the speed of operation can therefore be controlled.

In their planar configuration, the detector, modulator, electrical circuit, input waveguide and output waveguide form an SOI planar lightwave circuit (SOI-PLC). Silicon on insulator is a practical platform for the construction and integration of optical devices. Use of bulk semiconductor SOI and SOI-compatible materials in such a PLC technology as opposed to III-V heterostructure semiconductor photonic integrated circuit technology allows for integration of detectors and modulators without the low manufacturing yields associated with epitaxial re-growth of multiple heterostructures. Optional features of the invention will now be set out. These are applicable singly or in any combination with any aspect of the invention.

The first input waveguide, which is coupled to the input of the detector, is preferably also arranged to lie within the same horizontal plane as the detector, modulator, second input waveguide and output waveguide.

The semiconductor junction of the modulation region may be a p-n junction and may, for each modulator embodiment described, include 2 doped regions (p-n); 4 doped regions (p+, p, n, n+); or even 6 regions (p++, p+, p, n, n+, n++).

This p-n junction may further comprise a first and second electrode, the first electrode located directly above the p-doped region of the p-n junction and the second electrode located directly above the n-doped region of the p-n junction.

The semiconductor junction of the modulation region may be a p-i-n junction.

The p-doped and n-doped regions are therefore located at either side of the waveguide with an intrinsic region between. The doped regions may extend into the waveguide such that the width of the intrinsic region is less than the width of the waveguide.

The p-i-n junction may further comprise a first, second and third electrode, the first electrode located directly above the p-doped region of the p-i-n junction, the second electrode located directly above the n-doped region and the third electrode located directly above the intrinsic region of the p-i-n junction.

Electrodes are preferably metal strips which lie above the relevant doped region along its length. In this way, an electric bias can be applied to the relevant doped region via the electrode located above it.

In general the electrodes should be small and the doped regions, within semiconductor junctions (p-n, p-i-n, or otherwise) should be small.

The width of the doped regions taken along the horizontal plane and in a direction perpendicular to the longitudinal (or circumferential) axis of the doped waveguide is particularly important.

For example, in a single semiconductor junction such as a p-n junction, the total width of either the p-doped or n-doped region may be no more than 20 µm. Where the p doped region is graded into different sub-regions (for example in that it contains p, p+ and p++ regions), each sub-region may have a width of no more than 15 µm, but the width of different sub-groups may be substantially different to each other, for example the p doped region may be larger than each of the p+ and the p++ regions. In order to further improve on modulation and detector speeds, each sub-region may have a width no more than 10 µm, 5 µm, 2 µm, 1 µm, 0.5 µm or even 0.3 µm.

Although the sizes above are described in relation to p doped regions, they would equally apply to n doped regions.

Furthermore, where the modulator or detector waveguide includes a semiconductor-intrinsic-semiconductor junction (e.g. a p-i-n junction), each doped region may have a width taken along the horizontal plane and in a direction perpendicular to the longitudinal (or circumferential) axis of no more than 15 µm, or in order to further reduce the speed of operation, a width of no more than 10 µm, 5 µm, 2 µm, 1 µm, 0.5 µm or even 0.3 µm.

Electrodes which apply a bias to a doped region will preferably have a width which is less than the width of that doped region. Depending on the size of the relevant doped region, the electrode may therefore have a width of no more than 10 µm, or in order to further reduce the speed of operation, a width of no more than 5 µm, 2 µm, 1 µm, 0.5 µm or even 0.3 µm.

The ridge width for the waveguides of the detector or modulator regions may be 0.3-1 µm or preferably 0.45-0.9 µm and the slab height of the detector or modulator regions may be 0-0.4 µm, preferably 0.05-0.35 µm. The silicon overlayer thickness may be 0.2-3.5 µm, preferably 0.2-3.2 µm.

The amplitude or modulation region of the modulator is preferably formed from a bulk semiconductor material.

Preferably, the detector also comprises a waveguide portion with a semiconductor junction set horizontally across the waveguide.

Doped sections of the detector are therefore also located at either side of the waveguide rather than above and below the waveguide.

The semiconductor junction of the detector may be a p-i-n junction. As with the p-i-n modulator, the p-doped and n-doped regions are located at either side of the waveguide with an intrinsic region between.

Alternatively, the semiconductor junction of the detector may be an n-i-n, n-p-n or p-i-p junction such that the detector functions as a phototransistor. In this way, the detector itself provides a gain whilst avoiding the need for separate components which provide gain but undesirably increase resistance. Avoiding the need for optical amplifiers to amplify the optical input signal is also advantageous because optical amplifiers (such as a semiconductor optical amplifier, SOA) add noise to the optical signal and also draw significant additional electrical power as well as adding cost and complexity to the SOI platform. An alternative to optical amplifiers is electrical amplification of the received input signal. However, unless a transimpedance amplifier (TIA) is used, a high transimpedance resistance circuit is needed which disadvantageously prevents high speed operation.

Each of the n-i-n, n-p-n or p-i-p doping structures may provide a different amount of electrical gain and/or electrical bandwidth; Typically the higher the gain of the design, the lower the electrical bandwidth.

The photodetector is preferably formed from a bulk semiconductor material.

The electrical circuit may be a single strip of metal or a few strips of metal placed in series and/or in parallel with each other to form a simple RF circuit. In this way, the electrical circuit is reduced in complexity. A detector remodulator with such an electrical circuit is preferable where the received optical input signal has traveled over short distances and so does not incur heavy optical impairments. In such cases only amplification of the signal may be desired as the signal may have degraded in intensity. However, the amount of jitter or amplitude added should not be significant, so there should be no need to reshape or retime the signal.

The length of the electrical circuit from its electrical connection at the detector to its electrical detector at the modulator may take any value from 1.0 to $2 \times 10^4$ µm. Where the electrical circuit is kept advantageously small to increase speed, it may be no more than 10 µm, within the range of 1.5 µm to 10 µm, or even no more than 1.5 µm. The electrical circuit will be as wide and as thick as practically possible (for example 5.0-50 µm).

The electrical circuit may contain one or more resistors and the one or more resistors may include a variable resistor.

The electrical circuit may include nonlinear circuit elements (e.g. transistors) configured to amplify the electrical signal which forms an input to the modulator with a high speed circuit and/or limit the electrical signal in such a way that the signal does not drop below a minimum magnitude and/or above a maximum magnitude.

The electrical circuit may be monolithic. In this way, all of the manufacturing of the DRM is carried out in the semiconductor fabrication process. Only extra fabrication process steps are required.

The electrical circuit may be a stripline circuit. In this way, the fabrication of the electrical circuit is simplified and therefore more cost-effective than alternative circuits, requiring only application of a mask and a metallisation process. This type of electrical circuit is most suitable where the electrical circuit itself has a simple structure such as a single strip of metal or a few strips of metal. Again only extra fabrication process steps are required here.

The electrical circuit may be surface mounted. This type of electrical circuit is particularly useful when the circuit includes components such as transistors, filters and/or additional nonlinear components. Such components cannot be added as part of a stripline circuit. However, the inclusion of such elements will increase the cost of fabrication of the DRM.

The modulator may be an electro-absorption modulator (EAM). This type of modulator is advantageously simple and provides relatively high modulation speeds.

The EAM modulator is preferably formed of SiGe.

Alternatively, the modulator is a Mach-Zehnder Modulator (MZM). This type of modulator is advantageous over an EAM because it is capable of functioning over a larger wavelength bandwidth. In addition, there may be no need to engineer the material of the modulator such that it has a precise band-gap wavelength. In other modulators for example EAM modulators, control of SiGe composition is required, which may include incorporation and epitaxial growth of Ge or SiGe. The homogeneous silicon embodiment in particular is easier to fabricate.

On the other hand, the overall length of the device is longer and higher insertion losses mean that the MZM can be less power efficient than the EAM. In addition, this modulator requires a more complicated p-n doping structure with many more doping regions; and a more complicated electrical circuit in the form of a phase-matched and impedance matched RF driving circuit. An RF drive circuit which can reach operational speeds of 25 GHz and greater is not straightforward.

Furthermore, the MZM has a larger device size compared to other modulators and the MZM requires an additional fine tuning region to match the laser wavelength to the pass-band wavelength for the 'on' state.

Preferably, each arm of the MZM includes a modulation region (e.g. an amplitude or a phase modulation region). Each modulation region has a high operation speed (i.e. an operation speed of 25 Gb/s with a 3-dB bandwidth of 15 or more GHz).

Preferably, each arm of the MZM includes a phase shift region in addition to the modulation region and the phase shift region preferably has a lower speed than the modulation regions.

The phase shift region may comprise a p-i-n junction such that it operates by way of carrier injection. On the other hand, the phase shift region may comprise a p-n junction such that it operates by way of carrier depletion.

Phase shift regions may be low speed as their function is cavity FSR fine tuning. In this way, they provide a means of operating wavelength fine tuning as well as thermal drift compensation.

The modulation regions may be homogeneous silicon or may be silicon germanium.

The Mach-Zehnder modulator may be single-drive or may be dual-drive and may be a push/pull Mach-Zehnder modulator. Where a push/pull configuration is used, lower driving voltages are required in each arm.

According to an alternative embodiment, the modulator may be a Fabry-Perot resonator modulator.

The Fabry-Perot (F-P) resonator modulator may be formed in a single waveguide section by two reflectors in series with one or more modulation regions (e.g. phase modulation regions or amplitude modulation regions) between the two reflectors.

In this way, the use of an IIR filter means that the effect of the refractive index change induced by the modulation regions is enhanced by the increased number of round trips in the resonator cavity. Where modulation is carried out by carrier injection, a smaller injected current density is required to perform modulation with a given extinction ratio. Where modulation is carried out by carrier depletion, a smaller bias voltage is required to perform modulation with a given extinction ratio. Thus in a DRM less optical or electrical amplification is needed to perform modulation (as compared to the EAM or MZM embodiment). The F-P can also work over a larger bandwidth with the use of fine tuning.

On the other hand, the fabrication and design complexity of the Fabry-Perot embodiment is greater due to incorporation of the DBR gratings or reflectors. With increasing high speeds of the modulator (25 or 40 Gb/s), the manufacturing complexity and tolerances increase. In addition, the photon lifetime of the cavity must be kept optimally low which means that the cavity length must be short and the Finesse sufficiently low.

Furthermore, F-P modulators and IIR resonators in general are more sensitive to temperature so require active fine tuning of wavelength.

As with previous embodiments, the modulation region may be homogeneous Si or SiGe.

The reflectors of the Fabry-Perot resonator modulator may be DBR gratings and broadband DBR gratings with short lengths and deep etch depths are preferable. Each DBR reflector could take the form of just a single line broadband partial reflector (i.e. each could contain just one grating line per reflector, that is to say, a single waveguide defect).

The DBRs preferably have equal reflectance over the operating bandwidth of modulator. The reflective values of the gratings are chosen to give a Finesse value that is large enough to create enough cavity round trips to enhance the effect of Δn to sufficiently reduce the amount of drive current or drive voltage needed to perform the modulation with the desired extinction ratio, but small enough to give a cavity lifetime that is less than 1/(bit period).

The Fabry-Perot resonator cavity may include a phase shift region in addition to the modulation region, wherein the phase shift region has a lower speed than the modulation regions.

As with other modulator embodiments described herein, the phase shift region provides a means for cavity FSR tuning and may comprise a p-i-n junction or may comprise a p-n junction.

According to another alternative embodiment, the modulator is a ring resonator modulator.

As compared to Fabry-Perot modulators, ring resonator modulators are advantageously simpler to fabricate, but have tighter fabrication tolerances.

In addition, thermal tuning (heater pads) are preferably required for fine tuning ring resonators themselves are well known in the art. The ring resonator modulator preferably comprise a ring resonator with a semiconductor junction forming an opto-electronic region and, as with previous modulators described above, the semiconductor junction may be a p-n phase tuning region. In this way, the ring resonator is capable of functioning as a modulator by the application of a bias across the p-n junction.

The actual boundary where the p- and n-doped regions of the p-n junction meet is preferably circular and lies along or near the centre of the waveguide track equidistant from the inner and outer waveguide ridges. The n-doped region may be located on the inside of the ring waveguide including the inner half of the ring waveguide itself but also extending inwardly beyond the inner waveguide ridge. The p-doped region may be located on the outside of the ring waveguide, including the outer half of the ring waveguide but also extending outwards beyond the outer waveguide ridge.

In an alternative embodiment, the p-doped region may be located on the inside of the ring waveguide (including the inner half of the ring waveguide itself but also extending inwardly beyond the inner waveguide ridge) and the n-doped region may be located on the outside of the ring waveguide (including the outer half of the ring waveguide but also extending outwards beyond the outer waveguide ridge).

Optionally, the ring resonator modulator comprises a ring-shaped waveguide; a first straight waveguide to couple light into the ring-shaped waveguide; and a second straight waveguide to couple light out of the ring-shaped waveguide. In this case, the transmittance spectrum will form a periodic set of peaks, each peak separated from the adjacent two peaks via a wavelength difference proportional to the free spectral range (FSR) of the ring resonator modulator.

Optionally, the ring resonator modulator comprises a ring-shaped waveguide and a single straight waveguide to couple light both into and out of the ring-shaped waveguide. In this case, the transmittance spectrum will form a periodic set of sharp troughs, each trough separated from the two directly adjacent troughs via a wavelength difference proportional to the free spectral range (FSR) of the ring resonator modulator. As this transmittance spectrum is the inverse of that for the "dual straight waveguide" embodiment, such an arrangement will require an opposite drive signal (bias to be applied across the p-n junction) as compared to the single coupled waveguide version in order to give rise to the same modulation effect.

Where the ring resonator modulator includes first and second coupling waveguides the first straight waveguide is located at one side of the ring-shaped waveguide and the second straight waveguide is located at the opposite side of the ring-shaped waveguide.

Regardless of the mechanism for coupling light in and out of the ring waveguide, the ring resonator modulator preferably includes a fine tuning region in addition to the semiconductor junction. This fine tuning region may be a heater for thermal tuning. Such heaters applied to ring resonators are known in the art (see Dong et al. Optics Express, vol. 18, No. 11, 10941, 24 May 2010).

Alternatively, the fine tuning region may include an additional semiconductor junction incorporated into the resonator (i.e. in addition to the p-n junction which controls the high speed modulation).

The ring resonator modulator coupled to two straight waveguides is advantageous over the embodiment with one single straight waveguide in that it does not invert the drive signal (high voltage is 'on'). In addition, because on-resonance gives high transmission, the ring resonator modulator requires less voltage swing for good extinction ratio. However, the addition of a second straight waveguide increases the complexity of the fabrication as well as increasing the amount of metal crossing over the waveguide, therefore increasing not only the optical loss of the working device, but also the potential for complications during fabrication.

In all embodiments, a semiconductor optical amplifier (SOA) may be located within the waveguide platform before the input waveguide which couples light into the detector.

According to a second aspect of the present invention, there is provided a detector remodulator for use in a silicon on insulator waveguide platform, the detector remodulator including: a detector; a modulator and an electrical circuit connecting the detector to the modulator; wherein the modulator is a ring resonator modulator.

According to a third aspect of the present invention, there is provided a method of manufacturing a detector remodulator on a silicon on insulator platform, the method including the steps of: providing a detector and a first input waveguide which is coupled to the detector; providing a modulator comprising a waveguide having an electro-optical region, a second input waveguide which is coupled to the modulator, and an output waveguide which is also coupled to the modulator; and providing an electrical circuit which electrically connects the detector to the modulator; wherein the detector, modulator, input waveguides and output waveguide are all located within the same horizontal plane as one another; the method further comprising the step of generating a first doped region at one side of the waveguide and a second doped region at the opposite side of the waveguide, the first and second doped region forming a semiconductor junction set horizontally across the modulator waveguide.

The size of the doped regions may be chosen to optimise speed of the device.

The method may further comprise the steps of providing the features described herein in relation to one or more embodiments of the first aspect.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER
OPTIONAL FEATURES OF THE INVENTION

Figure 1:
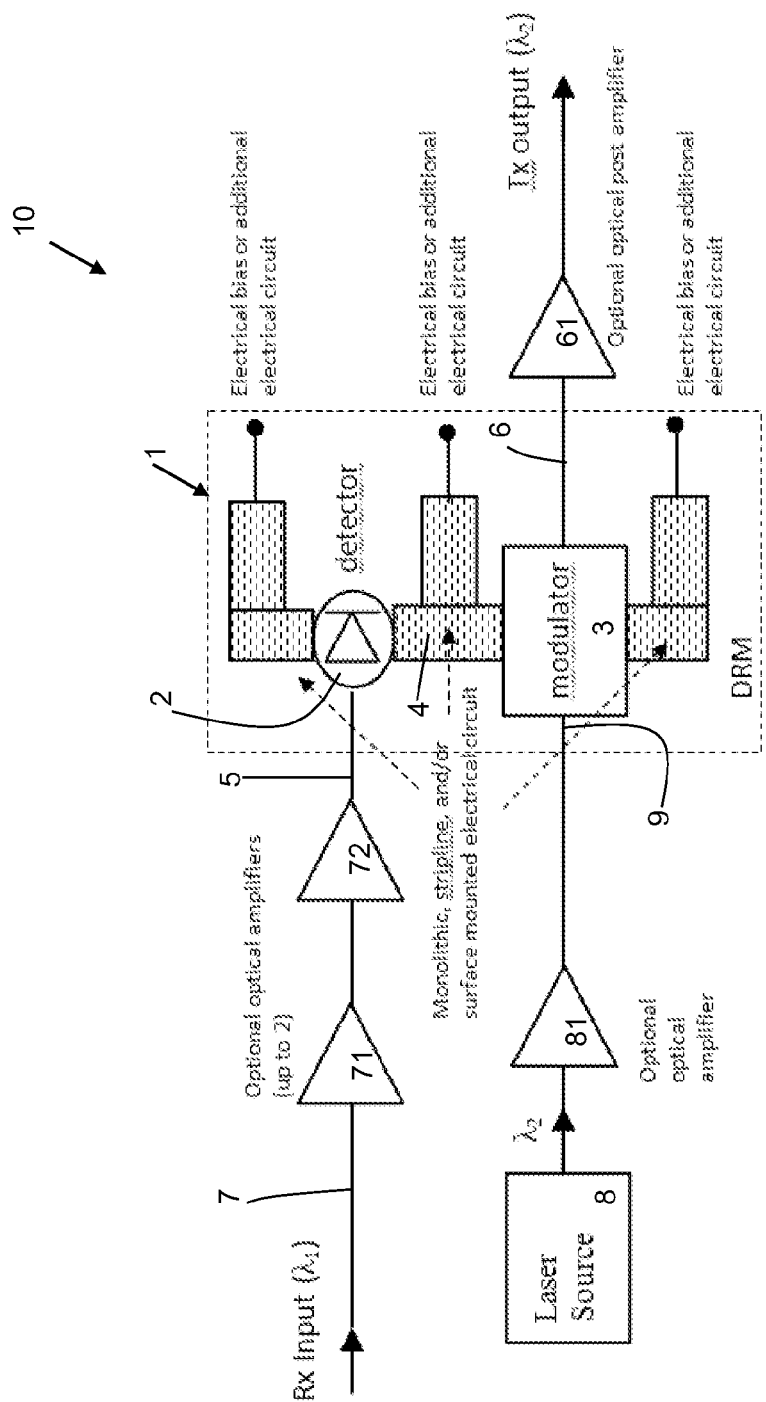
FIG. 1 shows a schematic circuit diagram of a wavelength conversion chip including a detector remodulator according to the present invention.

FIG. 1 shows a conversion chip 10 including a detector remodulator (DRM) 1 according to the present invention. The detector remodulator 1 comprises a silicon on insulator (SOI) waveguide platform which includes: a detector 2, a modulator 3 and an electrical circuit 4 which electrically connects the detector to the modulator. The detector 2 is coupled to an input waveguide 5 and the modulator 3 is coupled to an output waveguide 6.

The detector 2, modulator 3, input waveguide 5 and output waveguide 6 are arranged within the same horizontal plane as one another within the SOI waveguide platform. In the embodiment shown, a portion of the electrical circuit is located directly between the detector and the modulator.

The conversion chip includes a waveguide for a (modulated) first optical signal 7 of a first wavelength $\lambda_1$. In the embodiment shown in FIG. 1, the waveguide is coupled to the input waveguide 5 of the detector 2 via a first and second optical amplifier 71, 72, although in an alternative embodiment (not shown) the first optical signal may be directly coupled to the input waveguide 5 of the detector. The detector converts the modulated input signal into an electrical signal which is then applied to the modulator via the electrical circuit 4.

The conversion chip also includes a waveguide for an unmodulated optical input 8 corresponding to a second wavelength $\lambda_2$. This waveguide is coupled to an input waveguide 9 of the modulator 3 via an optical amplifier 81 (although may alternatively be directly coupled to input waveguide 9). The input waveguide 9 of the modulator also forms a part of the DRM and is oriented along the horizontal plane which includes the detector and modulator as well as the detector input waveguide and modulator output waveguide.

The electrical signal from the electrical circuit 4 will modulate the (unmodulated) optical input 8 thereby generating a modulated optical signal of the second wavelength $\lambda_2$ which is outputted by the modulator via the modulator output waveguide 6. This modulated output of the second wavelength may then me amplified via an optical amplifier 61 coupled to the modulator output waveguide 6.

A power monitor may be present (not shown).

Examples of detectors, electrical circuit components and modulators that can form part of embodiments of the DRM 1 shown in FIG. 1 are described below in relation to FIGS. 2 to 12 where like reference numbers are used to refer to features described above in relation to FIG. 1.

Figure 2:
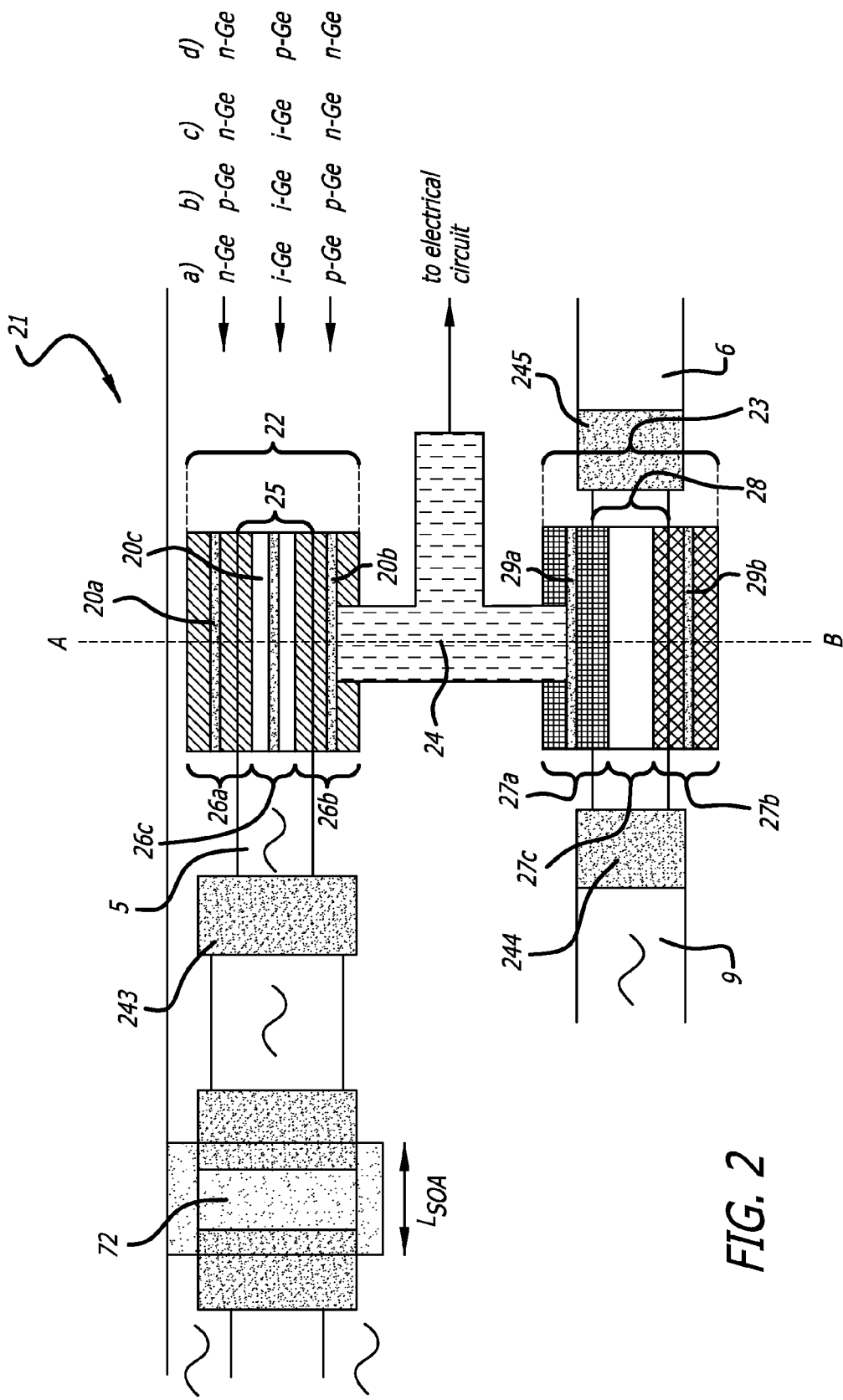
FIG. 2 shows a schematic top view of a silicon on insulator detector remodulator comprising an EAM modulator.

FIG. 2 shows a top view first embodiment of a DRM 21 in which the modulator 23 is an electro-absorption modulator (EAM). The DRM 21 of FIG. 2 includes a detector 22, modulator 23 and electrical circuit, a portion of which 24 is located between the detector and the modulator.

The detector 22 is made up of a bulk semiconductor material, in this case germanium, and includes waveguide portion 25 across which the semiconductor junction of the detector is set horizontally. The horizontal semiconductor junction of the detector 22 is made up of three regions: a first doped region 26*a*, a second doped region 26*b* and a third region 26*c* between the first and the second doped regions. This third region may be an intrinsic region or may also be doped.

In the variation of this embodiment shown in FIG. 2 (and labelled as option a)), the first region is an n-type region; the second region is a p-type region; and the third region is an intrinsic region, such that the semiconductor junction of the detector 22 is a p-i-n junction.

In other variations, the first, second and third regions may instead form a p-i-p; n-i-n or n-p-n junction (as shown as options b)-d) in FIG. 2). In each of these three variations, the detector functions as a phototransistor.

In the embodiment shown in FIG. 2, the first doped region (in this case a p-type region) 26*a* is located at one side of the waveguide 25 of the detector and extends into the waveguide past the waveguide walls. The second doped region (in this case an n-type region) 26*b* is located at the opposite side of the waveguide to the first region and also extends into the waveguide 25 of the detector. The third region 26*c* corresponding to the intrinsic part of the p-i-n junction therefore has a width along the horizontal plane which is less than the width w of the waveguide of the detector.

A first electrode for applying a bias to the first doped region is located above the first doped region, a second electrode for applying a bias to the second doped region is located above the second doped region, and a third electrode for applying a bias to the third region is located above the third region. In all three cases, the electrodes are located directly on top of the relevant doped region.

The electro-absorption modulator 23 of the DRM also has a modulation waveguide region in the form of an amplitude modulation region at which a semiconductor junction is set horizontally across the waveguide. The modulator 23 is made up of a bulk semiconductor material, in this case doped silicon germanium (SiGe), and includes waveguide portion 28 across which the semiconductor junction of the detector is set in horizontally. The horizontal semiconductor junction of the modulator 23 is made up of three regions: a first doped region 27*a*, a second doped region 27*b* and a third region 27*c* between the first and the second doped regions.

In the embodiment shown, the first doped region (in this case a p-type region) 27*a* is located at one side of the waveguide 28 of the modulator and extends into the waveguide past the waveguide walls. The second doped region (in this case an n-type region) 27*b* is located at the opposite side of the waveguide to the first region and also extends into the waveguide 28 of the detector. The third region 27*c* corresponding to the intrinsic part of the p-i-n junction therefore has a width along the horizontal plane which is less than the width of the waveguide of the modulator.

In an alternative embodiment (not shown) the doped region may include a plurality of doped regions (e.g. a total of 5 regions including p+, p, intrinsic, n and n+, or even a total of 7 regions including p++, p+, p, intrinsic, n, n+ and n++).

A semiconductor optical amplifier (SOA) is located within the waveguide platform before the input waveguide which couples light into the detector.

The modulator 23 includes a first waveguide transition region 244 between the modulator input waveguide 9 and the modulation waveguide region at which the semiconductor junction is set horizontally across the waveguide. The modulator also includes a second transition region 245 between the modulation waveguide region and the modulator output waveguide 6.

At the first transition region 244, the waveguide height and/or width are reduced from larger dimensions to smaller dimensions, and at the second transition region 245, the waveguide height and/or width are increased from smaller dimensions to larger dimensions. In this way, the waveguide dimensions within the modulator are smaller than those of the input and output waveguides. This helps to improve the operation speed of the modulator (although it does so at the expense of higher losses).

The detector 22 includes a transition region 243 between the input waveguide 5 of the detector and the actual waveguide of the detector at which the height and/or width of the waveguide are reduced from larger dimensions to smaller dimensions. In this way, the waveguide dimensions within the detector are smaller than the input waveguide which helps to improve the operation speed of the detector.

A portion of the electrical circuit 24 is located between the second doped region of the detector and the first doped region of the modulator forming an electrical connection between the detector and the modulator. Cross sectional views of different configurations for this connecting portion taken through line A-B of FIG. 2 are shown in FIGS. 3a, 3b, 3c, and 3d. In the configuration shown in FIG. 3a the connecting portion of the electrical circuit is stripline circuit 221 in the form of a metal strip, the metal strip extending from the electrode on top of the second doped region of the detector to the electrode on top of the first doped region of the modulator. The second doped region of the detector and the first doped region of the modulator are separated by a given distance d, and the in-plane space between the detector and modulator doped regions can be kept as silicon or Ge or SiGe or can be filled with insulating dielectric material 225 such as $SiO_2$. The metal strip forms a connection above this insulating filler.

Figure 3A:
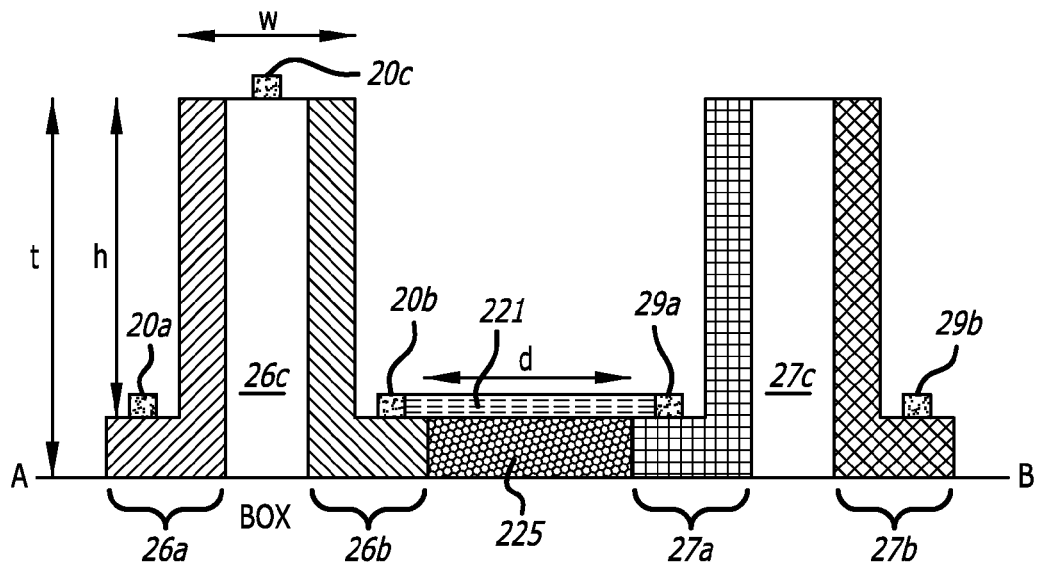
FIGS. 3a, 3b, 3c, and 3d show cross sectional views of the detector remodulator taken along the line A-B of FIG. 2 where: (a) the electrical circuit includes a metal strip; (b) and (c) the electrical circuit includes a monolithic doped conductor; and (d) the electrical circuit includes a surface mounted chip.
Figure 3B:
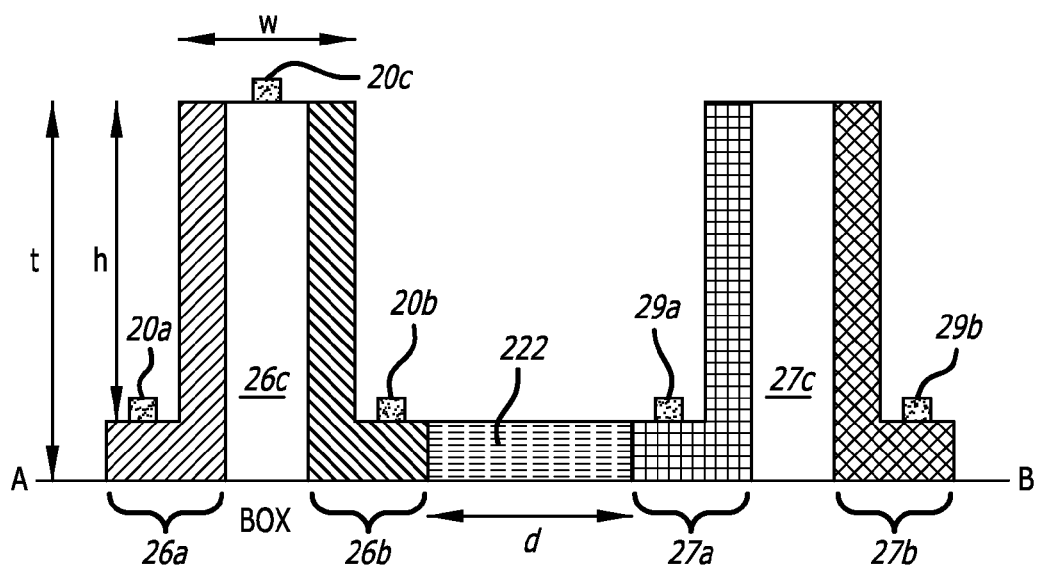
Figure 3C:
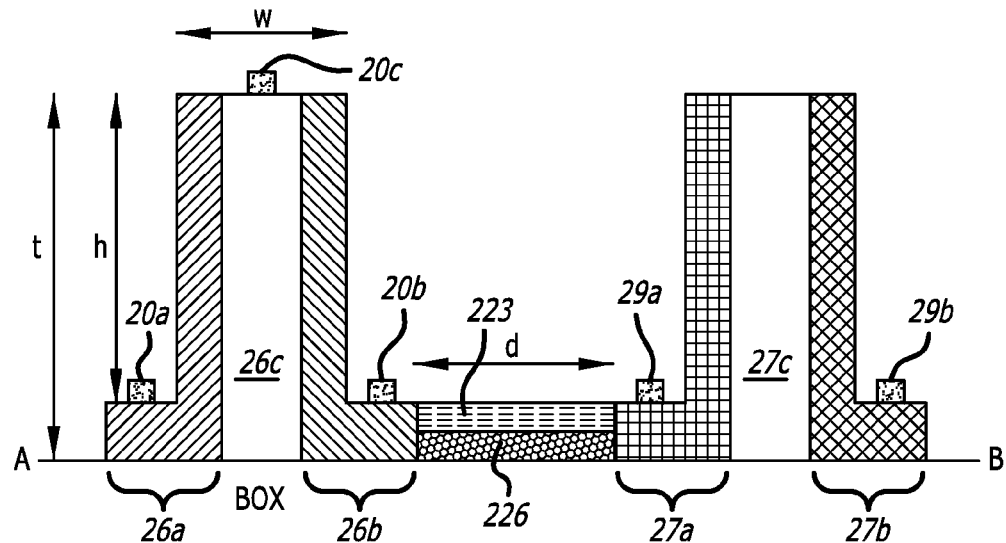
Figure 3D:
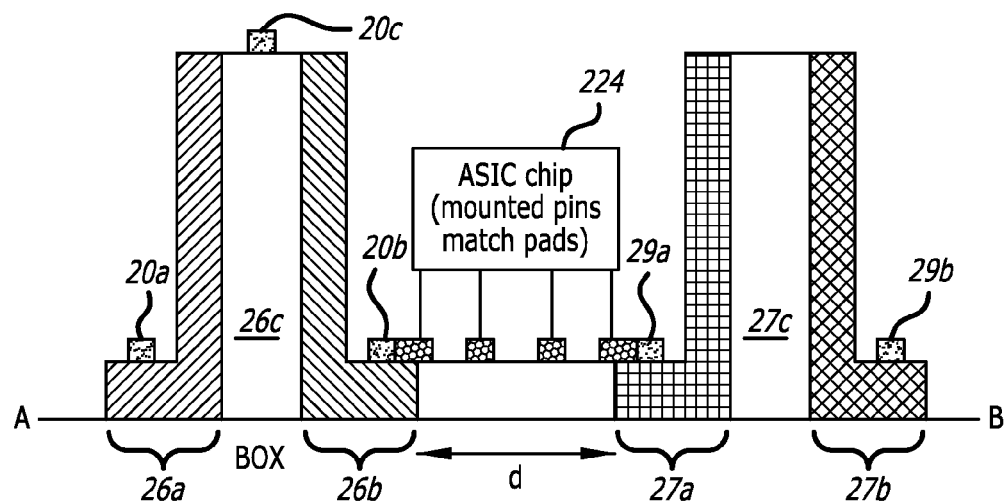
Figure 14A:
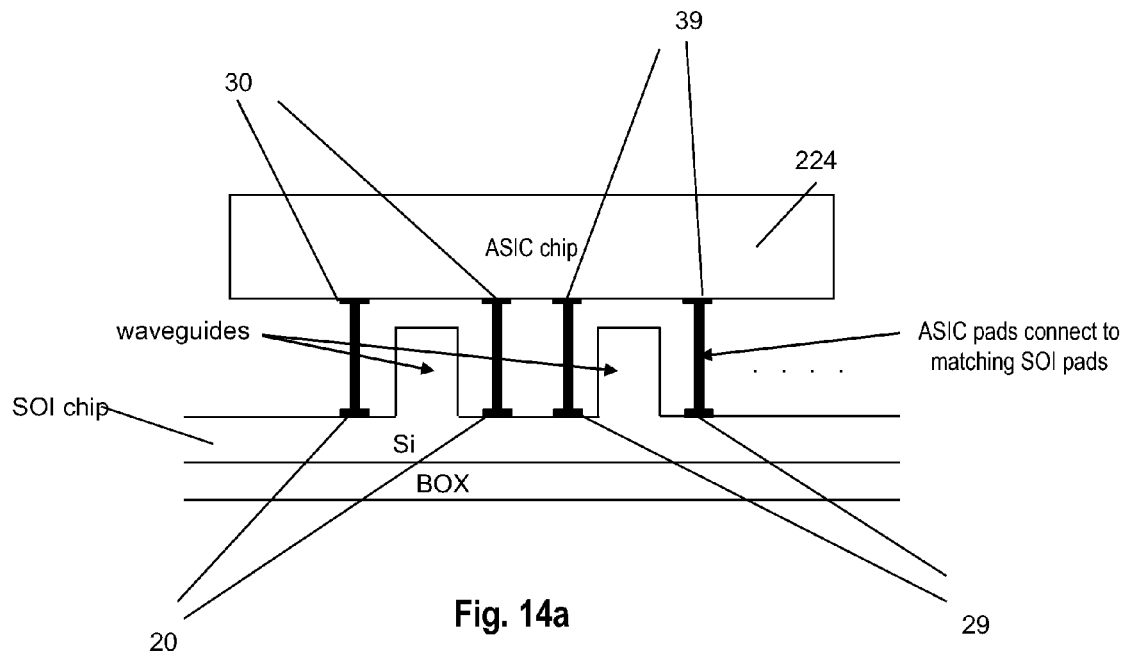
FIGS. 14*a* and 14*b* show the positioning of an ASIC chip on a DRM or multiple DRMs of the present invention.
Figure 14B:
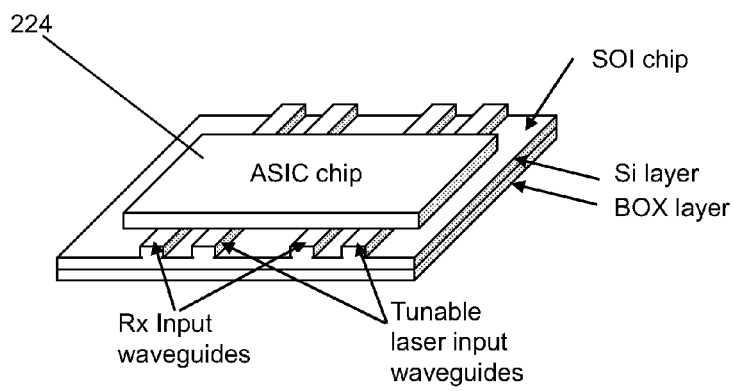

In the variations shown in FIGS. 3b and 3c, the electrical circuit is a monolithic doped conductor 222, 223. This conductive layer may extend the entire depth of the platform thickness down to the box level (i.e. t-h) as shown in FIG. 3b or may extend for only part of the platform thickness as shown in FIG. 3c, in which case an insulating layer 226 is located underneath the monolithic layer. In another variation shown in FIG. 3d, the connecting portion of the electrical circuit 224 is a surface mounted chip such as an Application-Specific Integrated Circuit (ASIC) in which case, conductive pads are located on the platform such that they can be connected to the pads or pins of the chip. FIGS. 14a and 14b give an alternate view of this embodiment. In FIG. 14a the ASIC chip 224 is shown mounted above the optical waveguides. Electrical pads 30 and 39 on the ASIC chip are connected, respectively, to electrical pads 20 and 29 on the optical chip. FIG. 14a is a cross-section view in a region where the waveguides are of silicon. Such waveguides are contiguous with the active photodetector and modulator waveguides illustrated, for example, in FIG. 3d. In FIG. 14b is another view of the same embodiment with the ASIC chip mounted above the active regions of the waveguides of two or more DRMs as well as some parts of the passive (silicon) regions. It will be apparent that one ASIC chip can be mounted above a plurality of DRMs and be configured to make electrical connection between the modulator and photodetector in a plurality of DRMS.

As can be seen from the cross sections in FIGS. 3a, 3b, 3c, and 3d, the doped regions extend into the detector waveguide and modulator waveguide and do so throughout the entire ridge height h of the waveguides.

Figure 4:
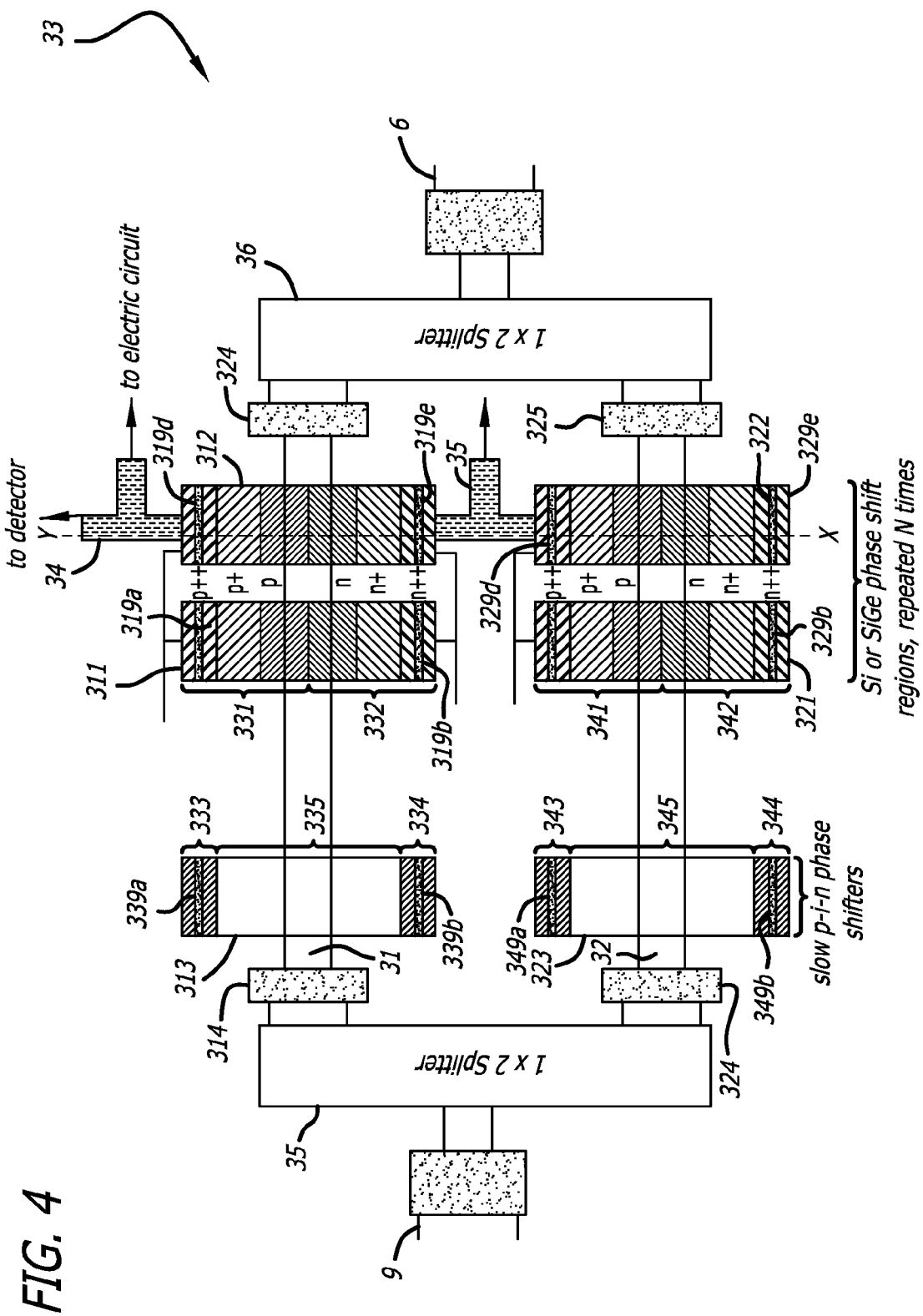
FIG. 4 shows a schematic top view of an alternative modulator in the form of a Mach-Zehnder modulator.

An alternative modulator is described below in relation to FIGS. 4 and 5. This modulator can replace the EAM in the embodiment shown in FIG. 2 to form an alternative DRM according to the present invention, where the remaining features and options of the DRM (other than the EAM) described in relation to FIG. 2 still apply. In this alternative DRM embodiment, the modulator is a Mach-Zehnder modulator 33.

The Mach-Zehnder modulator is made up of two waveguide branches forming a first interferometric arm 31 and a second interferometric arm 32; each arm including one or more phase shift modulation regions. In fact, in the embodiment shown, each arm contains a plurality of phase shift modulation regions 311, 312, 321, 322 (two of which are shown in each arm) as well as an additional phase shift region 313, 323.

Each modulation region is a phase modulation region made up of a bulk semiconductor material which has been doped to form a horizontal semiconductor junction in the form of a p-n junction (although an alternative semiconductor junction in the form of a horizontal p-i-n junction would be viable). The p-n junction is made up of a p-type region 331, 341 and an n-type region 332, 342. The p-type regions are each graded into three layers of varying different doping strengths: p, p+ and p++ and the n-doped regions are also graded into three layers of varying doping strengths n, n+ and n++ arranged so that the p and n layers overlap the arm waveguide and so that the p++ and n++ layers are furthest away from the waveguide. Electrodes are located directly above the outward-most doped regions. In particular, the electrodes are located directly above the p++ and n++ layers of the doped regions. Suitable bulk semiconductor material for the modulation region includes SiGe or homogeneous silicon.

The graded p-n junction structure extends the size of the horizontal junction and enables electrodes which apply a bias to the doped regions to be placed advantageously away from the ridge. Each extra pair of layers results in further spaced electrodes as the electrodes are preferably located directly over the most heavily doped regions. This increase in separation of the electrodes gives rise to an increased flexibility of the device design without compromising speed.

Doping of a bulk semiconductor material to form an electro-optical region is known in the art, both in the case of modulators and also detectors. In all of the devices described herein, the doping concentrations used would correspond to typical values found in the state of the art. For example, the doped regions of the detector may include regions with concentrations of up to $10 \times 10^{19}$ $cm^{-3}$. Doped regions of the modulator may take typical values of $10 \times 10^{15}$ $cm^{-3}$ to $10 \times 10^{17}$ $cm^{-3}$ for p doped regions and $10 \times 10^{15}$ $cm^{-3}$ to $10 \times 10^{18}$ $cm^{-3}$ for n doped regions. However, doped regions (p and/or n) may have higher values of as much as $10 \times 10^{20}$ $cm^{-3}$ or $10 \times 10^{21}$ $cm^{-3}$.

The additional phase shift region has a lower speed than the modulation regions so may be made of an alternative material such as homogeneous silicon. In the embodiment shown, the additional phase shift region comprises a horizontal semiconductor junction in the form of a p-i-n junction, the p and n doped regions of which do not extend into the waveguide of the first or second waveguide arm. In fact, the intrinsic regions 335, 345 extend beyond the boundary. Electrodes 339a, 349a which apply a bias to the p-doped regions are located directly above the respective p-doped regions 333, 343 and electrodes 339b, 349b which provide a bias to the n-doped regions are located directly above the n-doped regions 334, 344.

The electrodes above both the modulation regions and phase shift regions are strips which lie along the length of the doped region (along a direction parallel to the longitudinal axis of the waveguide). It is desirable for the electrodes to have as much contact with the respective doped regions as possible whilst also retaining the small sizes that are advantageous to speed of modulation.

An input 1×2 coupler couples unmodulated light from the input waveguide 9 into the two arms of the modulator and an output 2×1 coupler couples the light from the two arms into the output waveguide 6 to form a modulated output signal having the same wavelength as the unmodulated input signal. High-speed Mach-Zehnder modulators are known to the person skilled in the art and may take the form of the Mach-Zehnder modulators described by Dong et al., Optics Express p. 6163-6169 (2012) or D. J. Thompson et al, Optics Express pp. 11507-11516 (2011). The phase difference between modulated light exiting the first arm and modulated light exiting the second arm will affect the interference pattern generated (in time) when light from the two arms combine, therefore altering the amplitude of the light in the output.

Each arm includes a waveguide transition region 314, 324 between the input 1×2 coupler and the phase shift region and another waveguide transition region 315, 325 between the modulation regions and the output 2×1 coupler. In this way, the waveguide dimensions within the resonator modulator can be smaller than those of the input and output waveguides. This helps to improve the operation speed of the modulator (although it does so at the expense of higher losses).

A central electrical circuit 35 (which is an extension of the DRM electrical circuit) is located between the modulation regions of one arm and the modulation regions of the second arm. This circuit is required where the respective modulation regions of the two arms of the MZM are driven in series in a single drive condition or in a dual drive condition. The nature of this central electrical circuit 35 will control both whether the MZM is single drive or dual drive, but also whether the two arms are driven in series or in parallel.

Figure 5:
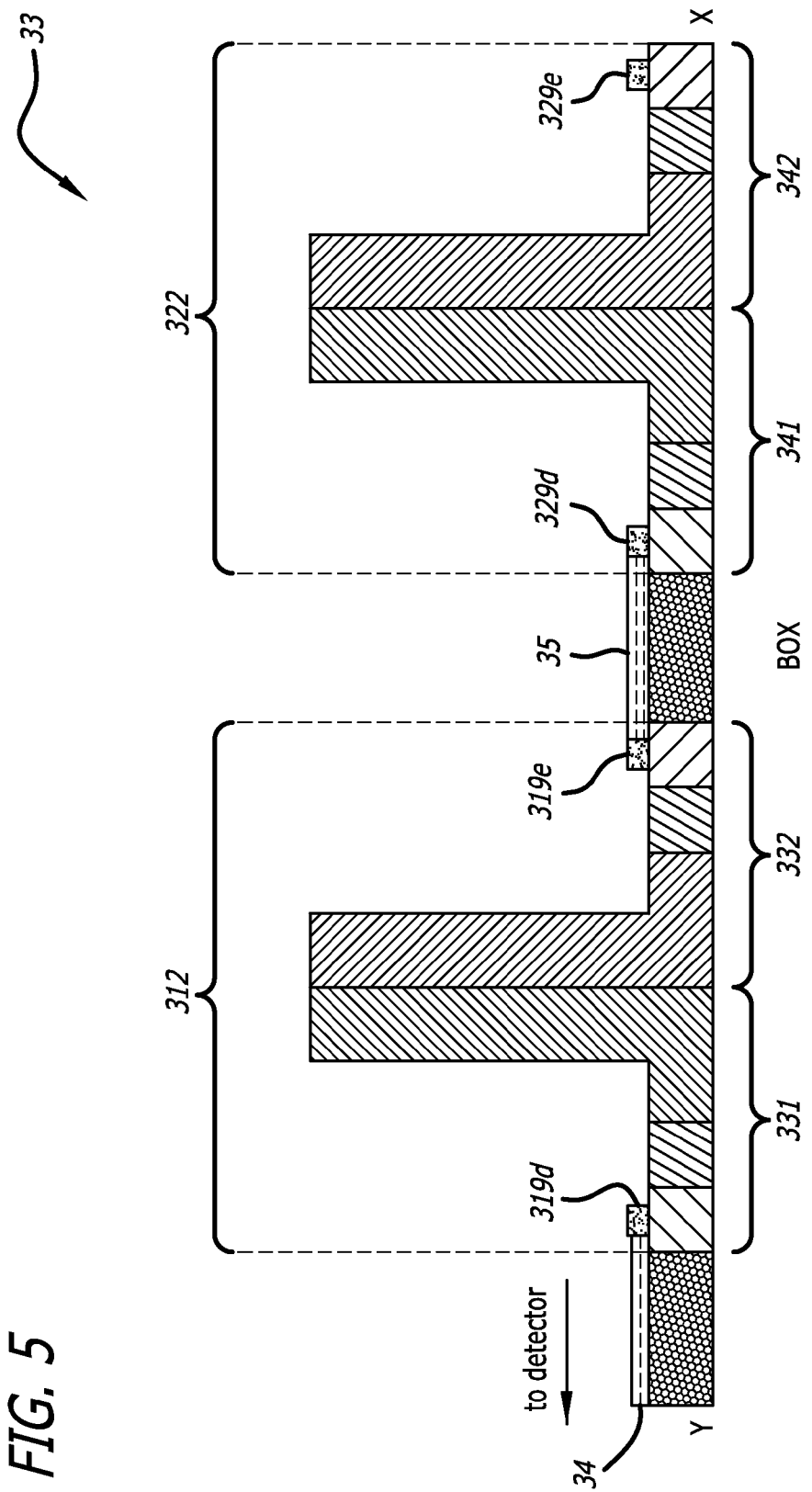
FIG. 5 shows a side view of the modulator of FIG. 4 taken along the line X-Y of FIG. 4.

The electrical circuit connection 34 between the M-Z modulator and the detector (detector not shown) and the central circuit connection 35 between modulation regions in the two arms can each take the form of any one of the electrical circuit connections described above in relation to FIGS. 3a to 3d but is depicted in FIG. 5 as a stripline circuit in the form of a single metal strip with insulating filler material located underneath the strip. In addition to this electrical connection, the Mach-Zehnder modulator includes a further electrical connection 35 located between a phase modulating region of the first arm 310 and a corresponding phase modulating region in the second arm 320 to connect an electrode 319e over an n++ doped region of the phase modulating region 312 of the first arm 310 with an electrode 329d over a p++ doped region of the corresponding phase modulating region 322 of the second arm. A further alternative modulator is described below with reference to in FIGS. 6, 7 and 8. This modulator can replace the EAM in the embodiment shown in FIG. 2 to form a further alternative DRM according to the present invention, where the remaining features and options of the DRM (other than the EAM) described in relation to FIG. 2 would still apply. In this alternative DRM embodiment, the modulator is a Fabry-Perot (F-P) resonator modulator 43.

The F-P resonator modulator 43 is formed in a single waveguide section by two reflectors in series with one or more modulation regions 411, 412, 413 located between the two reflectors. In the embodiment shown in FIG. 6, the reflectors take the form of Distributed Bragg Reflectors (DBRs) DBR1, DBR2.

Figure 6:
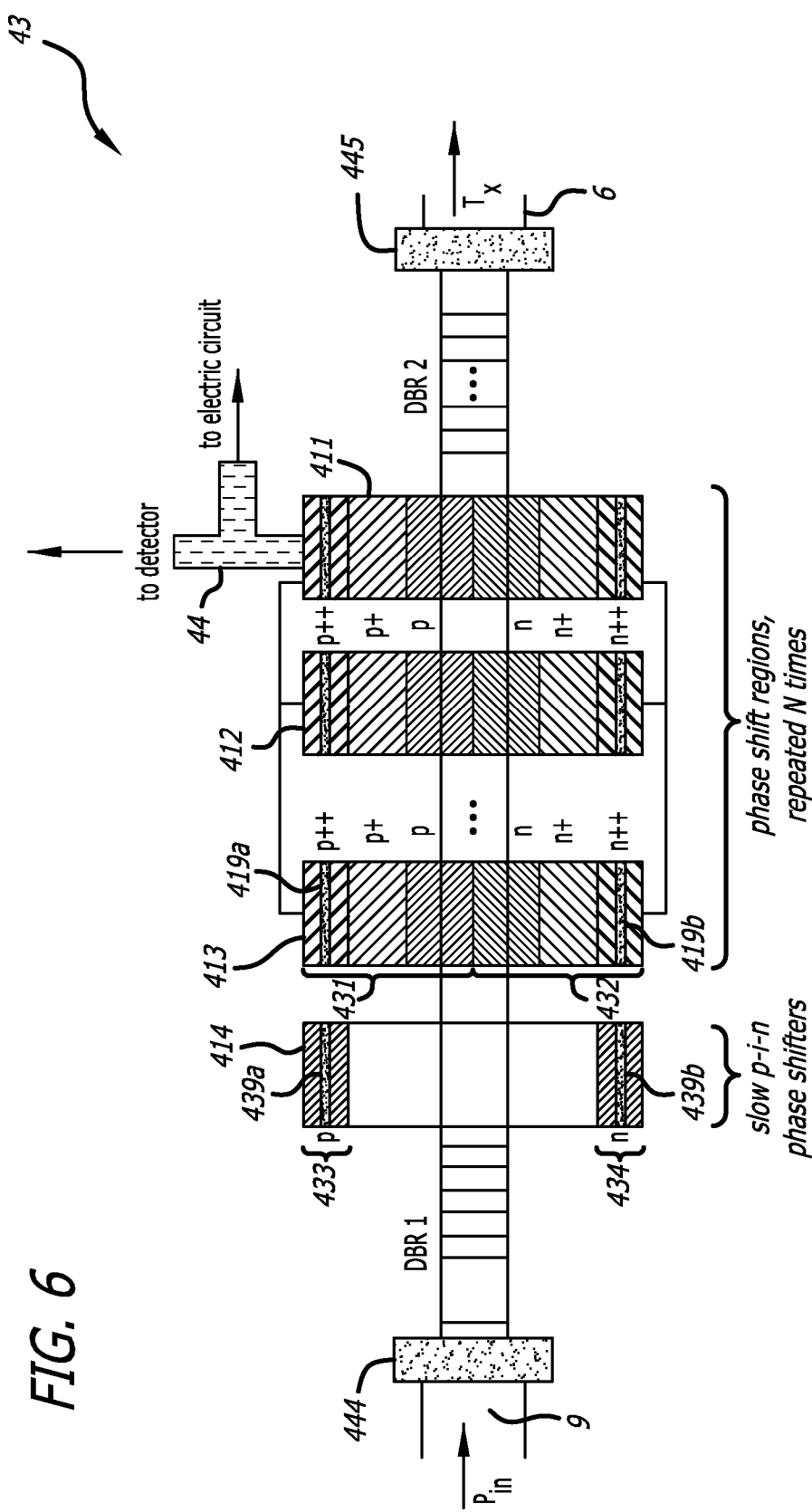
FIG. 6 shows a schematic top view of an alternative modulator in the form of a Fabry-Perot resonator modulator.

The Fabry-Perot resonator cavity shown in FIG. 6 actually includes a plurality of modulation regions 411, 412, 413 (3 of which are shown). These are formed in a bulk semiconductor medium and comprise a p-n junction the same as those of the modulation regions described above in relation to FIG. 4.

Each modulation region 411, 412, 413 is made up of a bulk semiconductor material which has been doped to form a horizontal semiconductor junction in the form of a p-n junction (although an alternative semiconductor junction in the form of a horizontal p-i-n junction would also be viable). Each p-n junction is made up of a p-type region 431 and an n-type region 432. The p-doped regions are each graded into three layers of varying different doping strengths: p, p+ and p++; and the n-doped regions are also graded into three layers of different doping strengths n, n+ and n++. These layers are arranged so that the p and n layers overlap the waveguide, followed by the p+ and n+ layers and the p++ and n++ layers so that the p++ and n++ layers are furthest away from the waveguide. Electrodes are located directly above the outward-most doped regions. In particular, the electrodes are located directly above the p++ and n++ layers of the doped regions. Suitable material for the modulation region includes SiGe or homogeneous silicon.

The Fabry-Perot resonator cavity also includes an additional phase shift region 414 with a lower speed of operation than the modulation regions. As with the phase shift regions described above in relation to the Mach-Zehnder modulator, the function of this phase shift region 414 is to provide low speed cavity FSR fine tuning and therefore operating wavelength fine-tuning and thermal drift compensation. The phase shift region is shown in FIG. 6 as a p-i-n semiconductor junction operating in a carrier injection mode (but could alternatively comprise a p-n phase shift region operating in a carrier depletion mode). As with the p-i-n phase shift regions described above, the p and n doped regions do not extend into the waveguide of the first or second waveguide arm. In fact, the intrinsic regions extend beyond the boundary. Electrodes 439a which apply a bias to the p-doped regions are located directly above the respective p-doped regions 433 and electrodes 439b which provide a bias to the n-doped regions are located directly above the n-doped regions 434.

The electrodes above both the modulation regions and phase shift regions are strips located over the doped regions and lie along the length of the doped region (along a direction parallel to the longitudinal axis of the waveguide). The electrodes lie along the entire length of the doped regions (length parallel to the longitudinal axis of the waveguide) because is desirable for the electrodes to have as much contact with the respective doped regions as possible whilst also retaining the small sizes (small thicknesses) that are advantageous to speed of modulation.

An electrical circuit connection 44 between the F-P modulator and the detector (detector not shown) can take the form of any one of the electrical circuit connections described above in relation to FIGS. 3a to 3d.

The F-P resonator is a resonant F-P filter (also infinite-impulse-response, or IIR filters) which increases the modulation tuning efficiency at the expense of tuning speed, increased temperature sensitivity, and increase manufacturing complexity due to the need for inclusion of the DBR gratings. In an IIR filter, the effect of the index change induced by the phase shifter is enhanced by the number of round-trips in the resonator cavity, thus a smaller injected current density (in the carrier injection case) or bias voltage (in the carrier depletion case) is needed to perform modulation with the same extinction ratio. Thus less optical or electrical amplification would be needed to perform the modulation as compared to the EAM and M-Z embodiments previously described. However manufacturing complexity and tolerances are increased because to reach high modulation speeds of 25 or 40 Gb/s, the photon lifetime of the cavity must be kept small (in addition to the requirement to make a high-speed phase modulator) meaning the cavity length must be short and the Finesse sufficiently low. Therefore the fabrication and design complexity is high due to the need to incorporate DBR gratings with potentially short lengths and deep etch depths.

The F-P modulator includes a waveguide transition region 444 between the input waveguide 9 and the first DBR and another waveguide transition region 445, between the second DBR and the output waveguide. At the first transition region 444, the waveguide height and width are reduced, and at the second transition region, the waveguide height and width are increased. In this way, the waveguide dimensions within the cavity are smaller than those of the input and output waveguides. This can be used to help to improve the operation speed of the modulator (although it does so at the expense of higher losses).

Figure 7:
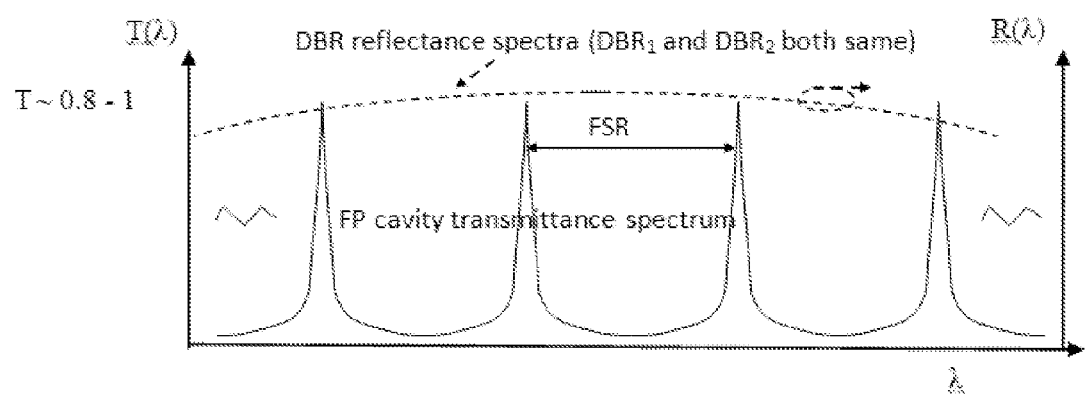
FIG. 7 shows an example drawing of a transmittance spectrum for the Fabry-Perot resonator modulator.

Modulation of the resonator is described below in relation to FIGS. 7 and 8. Referring to the reflectance spectra of FIG. 7, it is clear that DBR gratings DBR1 and DBR2 are broad-band reflectors which have equal reflectance over the operating bandwidth of the tunable laser. The reflectance values R1 and R2 are chosen to give a Finesse value that is large enough to create enough cavity round trips to enhance the effect of Δn (a sufficient X factor of the resonator) to sufficiently reduce the amount of drive current or voltage needed to perform the modulation with the desired extinction ration, but small enough to give a cavity lifetime that is still <1/(bit period). The transmittance of the resonator preferably has a maximum value of between 0.8 and 1 and may be 0.8 as shown in FIG. 7.

Figure 8A:
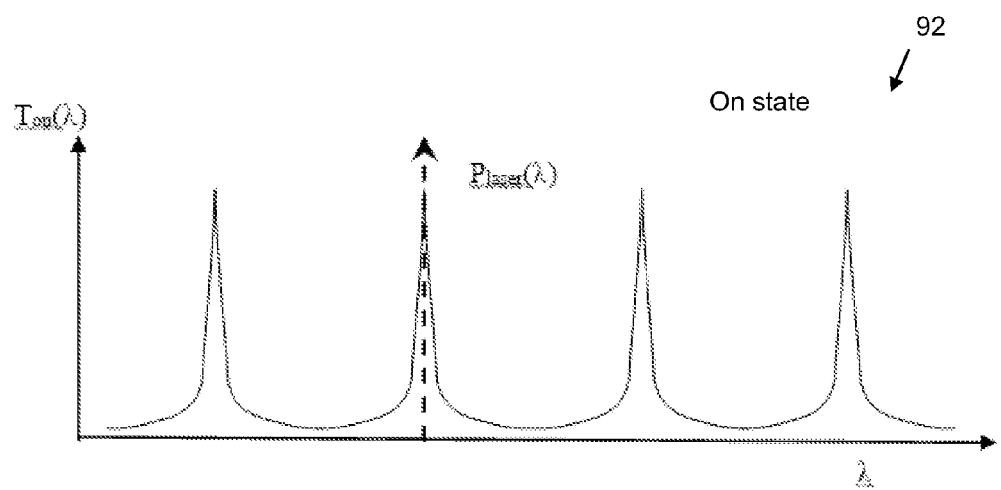
FIG. 8a shows a peak in the transmittance spectrum of the Fabry-Perot resonator tuned to the laser emission wavelength ("on state") and FIG. 8b shows a peak in the transmittance spectrum of the Fabry-Perot resonator detuned from the laser emission wavelength ("off state")
Figure 8B:
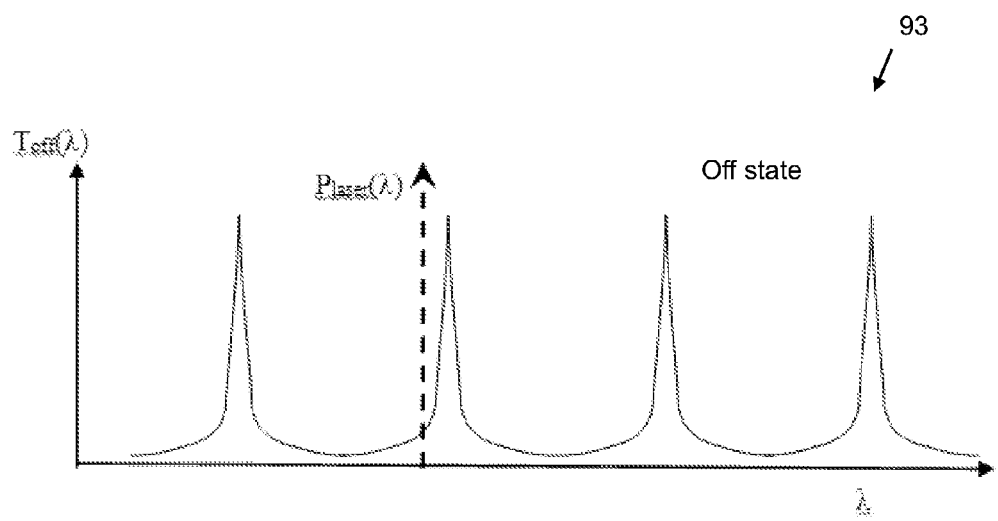

Referring to the transmittance spectra 92, 93 shown in FIG. 8, a resonant peak of the F-P cavity must be tuned to the wavelength of the (non-modulated) laser ($P_{laser(\lambda)}$) in the on-state (FIG. 8*a*). However, in the off-state (FIG. 8*b*), the phase of the cavity is altered to detune the resonance peak away from the wavelength of the laser thereby producing a sufficient modulation extinction ratio. When a bias is applied to the electrodes of the p-n junctions of the modulation regions, and the bias is modulated between the on and off states, the transmittance spectrum is therefore switched between on and off positions resulting in the output being modulated from on to off or vice versa. By actively adjusting the bias to the phase shift regions, the alignment of the resonant peak of the F-P cavity to the wavelength of the laser can be maintained in the presence of a thermal drift.

Further alternative modulators are described below with reference to in FIGS. 9 to 13. Each of these modulators can replace the EAM in the embodiment shown in FIG. 2 to form a further alternative DRM according to the present invention where the remaining features and options of the DRM (other than the EAM) described in relation to FIG. 2 would still apply. In each of these alternative embodiments, the modulator is a ring resonator modulator 53, 153.

Figure 9:
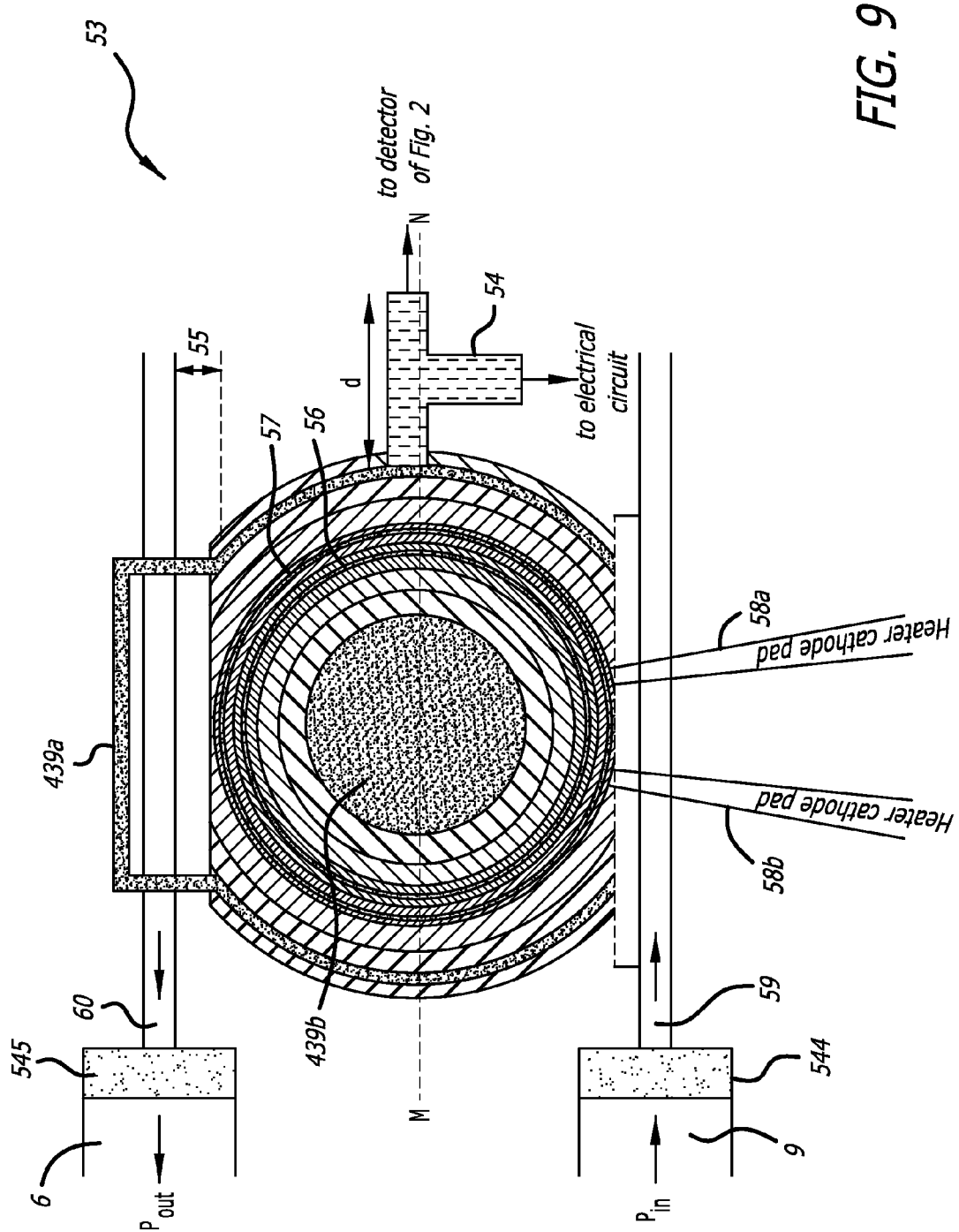
FIG. 9 shows a schematic top view of an alternative modulator in the form of a ring resonator modulator.
Figure 10:
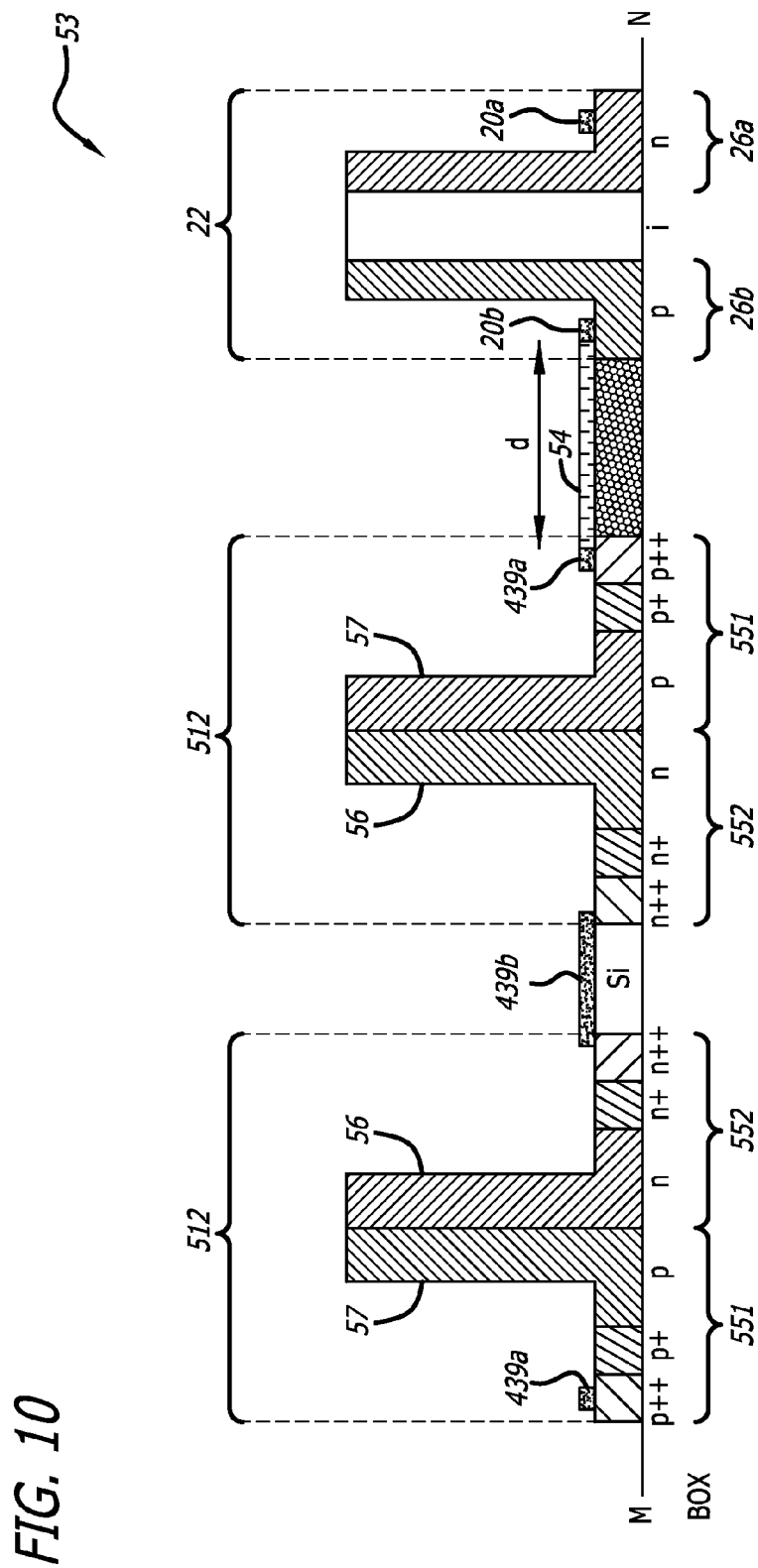
FIG. 10 shows a side view of the ring resonator modulator of FIG. 9 taken along the line M-N of FIG. 9.
Figure 11:
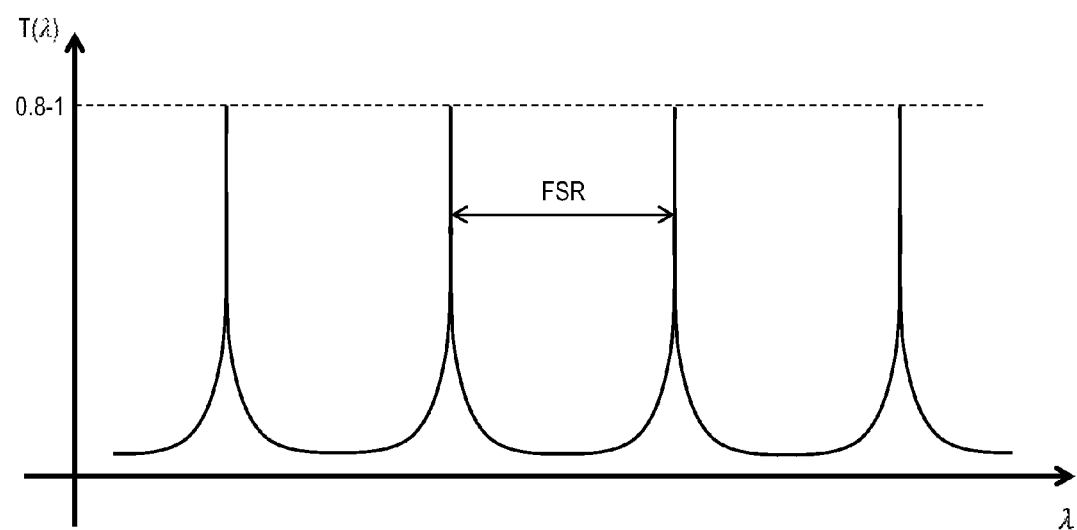
FIG. 11 shows an example of a transmittance spectrum for the ring resonator modulator.

Taking the first of two ring resonator DRM embodiments and referring in particular to FIGS. 9 to 11, the ring resonator modulator 53 is formed from a ring waveguide section, a first straight waveguide 59 coupled at one side of the ring waveguide and a second straight waveguide 60 coupled to the other side of the ring waveguide. The ring waveguide is defined between an inner waveguide ridge edge 56 and an outer waveguide ridge edge 57. The cross section across dashed line M-N in FIG. 9 is shown in FIG. 10. The ring resonator modulator also comprises a of modulation region 512 formed in a bulk semiconductor medium doped to give a circular p-n junction which is set horizontally across the waveguide (An alternative semiconductor junction in the form of a horizontal p-i-n junction would also work).

Figure 12:
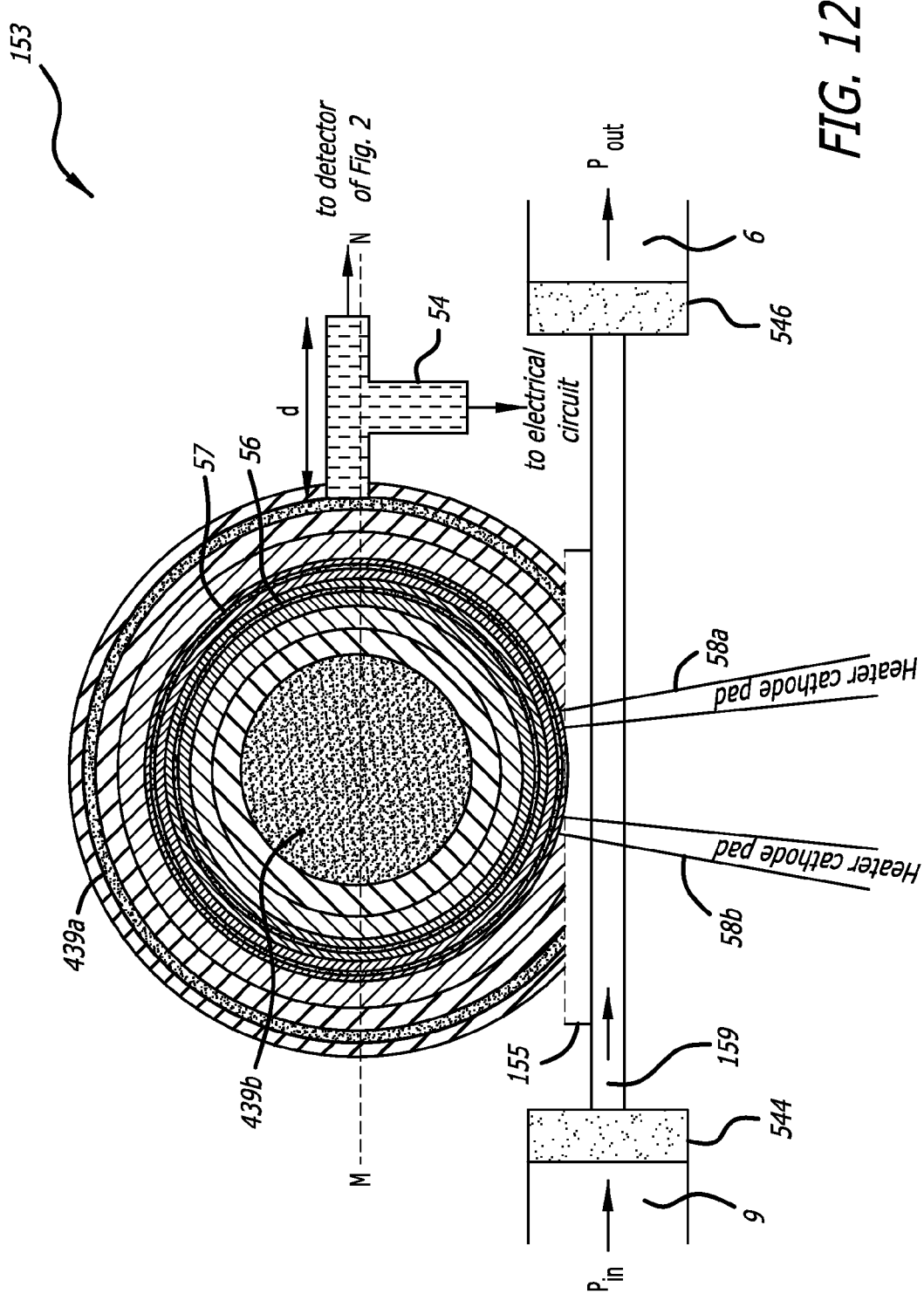
FIG. 12 shows a schematic top view of a further alternative modulator in the form of an alternative ring resonator modulator.

Throughout this document, ring waveguides may take the form of any ring shape including: a circle (as shown in FIGS. 9 and 12), a race track; or an elliptical shape. Furthermore, the circular doped regions may take the form of a circle with constant radius; a race-track shape; or an elliptical shape.

In the embodiment shown in FIG. 9, the circular p-n junction becomes discontinuous along a portion of its circumference where a continuous circular doped region would otherwise overlap with the input and output straight waveguides. Suitable bulk semiconductor materials for the modulation region include SiGe and homogeneous silicon.

The p-n junction is made up of a p-type region 551 and an n-type region 552. The p-doped regions are each graded into three concentric layers of varying different doping strengths: p, p+ and p++ and the n-doped regions are also graded into three concentric layers of varying doping strengths n, n+ and n++ arranged so that the p and n layers overlap the ring waveguide and extend radially outwards and inwards respectively within the horizontal plane of the junction beyond the outer and inner waveguide ridge edges. The p++ and n++ doped layers lie furthest away from the ring waveguide. Because of the discontinuous nature of the outer doped portions, the p+, p++, n+ and n++ layers are each made up of two opposing crescent shaped regions rather than complete circular shape as they do not extend the full way around the ring waveguide. This gives clearance for the straight waveguides 59, 60 which couple light in and out of the ring waveguide thereby ensuring that the p-n junction does not modify the refractive index in the light-coupling regions, and therefore does not modify the coupling ratio between the ring and the straight waveguides.

A ring gap separation 55 exists on either side of the ring waveguide between the ring waveguide and each of the straight waveguides 59, 60. The magnitude of this gap determines the value of the coupling coefficient κ of the resonator.

Electrodes are located directly above the outer-most and inner-most respective doped regions. In particular, the electrodes are located directly above the p++ and n++ layers of the doped regions. A central circular electrode 439*b* is located above the n++ doped region to apply a bias to the n-doped region. A bias is applied to the p-doped region via a looped electrode 439*a* which extends above and along the crescent shaped p++ regions forming two crescent shaped electrode portions which are then joined together by further electrode portions crossing over one of the straight waveguides to form a closed single electrode.

An electrical circuit connection 54 between the ring resonator modulator and the detector (detector not shown) can take the form of any one of the electrical circuit connections described above in relation to FIGS. 3*a* to 3*d*.

The ring resonator modulator 53 includes a first waveguide transition region 544 between the modulator input waveguide 9 and the first straight waveguide 59 which couples light into the ring resonator and a second transition region 545 between the second straight waveguide which couples light out of the waveguide and the modulator output waveguide 6.

At the first transition region 544, the waveguide height and/or width are reduced, and at the second transition region, the waveguide height and/or width are increased. In this way, the waveguide dimensions within the ring resonator modulator are smaller than those of the input and output waveguides. This helps to improve the operation speed of the modulator (although it does so at the expense of higher losses).

The transmittance spectrum of the ring resonator is shown in FIG. 11 as a periodic set of peaks, each peak separated from the adjacent two peaks via a wavelength difference equal to the free spectral range (FSR) of the ring resonator. The free spectral range of the transmittance signal being set by the size of the ring waveguide. The transmittance of the resonator preferably has a maximum value of between 0.8 and 1 and may be 0.8.

Modulation of the light occurs via the same process as the F-P modulator, the ring resonance must be tuned to the wavelength of the (non-modulated) laser ($P_{laser(\lambda_l)}$) in the on-state (FIG. 8a). However, in the off-state (FIG. 8b), the phase of the cavity is altered to detune the resonance peak away from the wavelength of the laser thereby producing a sufficient modulation extinction ratio. When a bias is applied to the electrodes of the p-n junctions of the ring, and the bias is modulated between the on and off states, the transmittance spectrum is therefore switched between on and off positions resulting in the output being modulated from on to off or vice versa.

The ring resonator modulator 53 also includes a fine tuning region in the form of a heater (not shown) for thermal tuning.

By actively adjusting the voltage across the phase tuning heater pads 58a and 58b, the alignment of the resonant peak of the F-P cavity to the wavelength of the laser can be maintained in the presence of ambient thermal drift.

Figure 13A:
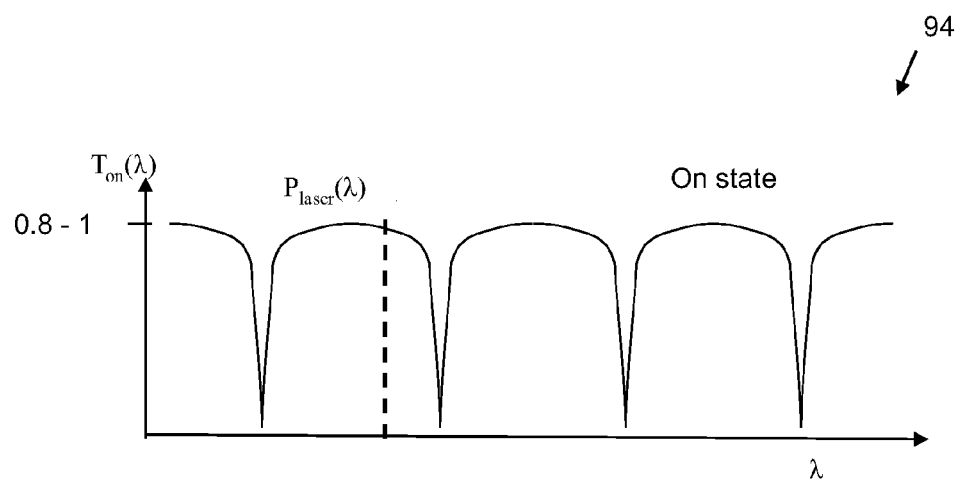
FIG. 13 shows an example of a transmittance spectrum for the ring resonator modulator of FIG. 12 (a) tuned to the laser emission wavelength ("on state") and (b) de-tuned from the laser emission wavelength ("off state")
Figure 13B:
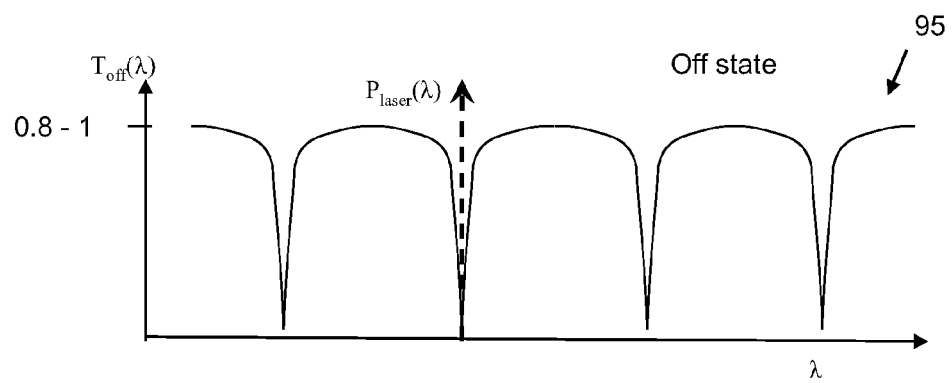

Referring to FIGS. 10, 12 and 13, the ring resonator modulator 153 according to the second of the two ring resonator DRM embodiments is described. The difference between the ring resonator modulator of FIG. 12 and that of FIG. 9 is the fact that the ring waveguide of the resonator modulator of FIG. 12 is coupled to no more than one straight waveguide. A single straight waveguide 159 only is coupled to the ring waveguide at one side. In this embodiment, the single straight waveguide is therefore configured to couple light both into and out of the ring waveguide.

As with the previous ring resonator embodiment, the ring waveguide is defined between an inner waveguide ridge 56 and an outer waveguide ridge 57. The cross section across dashed line M-N for this embodiment is also shown by FIG. 10 and the parts of the description above relating to FIG. 10 therefore apply here. In particular, the ring resonator embodiment of FIG. 12 also includes a modulation region 512 formed in a bulk semiconductor medium doped to give a circular p-n junction which is set along a horizontally across the waveguide.

The p-n junction is made up of a p-type region 551 and an n-type region 552. The p-doped regions are each graded into three concentric layers of varying different doping strengths: p, p+ and p++ and the n-doped regions are also graded into three concentric layers of varying doping strengths n, n+ and n++ arranged so that the p and n layers overlap the ring waveguide and extend radially outwards and inwards respectively beyond the waveguide ridge edges 56, 57 within the horizontal plane of the semiconductor junction.

The p, n, n+ and n++ regions are ring shaped. However the p+ and p++ regions on the outside of the p-type region are C-shaped; defining a discontinuity where the ring waveguide comes into close contact with the straight waveguide (i.e. where the outer-most doped regions would otherwise overlap the straight waveguide). The clearance between the doped regions and the straight waveguide ensures that the p-n junction does not modify the refractive index in the light-coupling regions, and therefore does not modify the coupling ratio between the ring and the straight waveguide.

A ring gap separation 155 exists between the ring waveguide and the single straight waveguide 159, the magnitude of which determines the value of the coupling coefficient κ of the resonator.

Electrodes are located directly above the respective outer-most and inner-most doped regions that they apply a bias to. In particular, the electrodes are located directly above the p++ and n++ layers of the doped regions. A central circular electrode 439b is located above the n++ doped region to apply a bias to the n-doped region. A bias is applied to the p-doped region via a looped electrode 439a which extends along the C-shaped (i.e. the full length of the discontinuous circumference of the p++ region).

An electrical circuit connection 54 between the ring resonator modulator and the detector (detector not shown) can take the form of any one of the electrical circuit connections described above in relation to FIGS. 3a to 3d.

The ring resonator modulator 153 includes a first waveguide transition region 544 between the modulator input waveguide 9 and the single straight waveguide 59 which couples light into the ring resonator and a second transition region 546 between the single straight waveguide 59 and the modulator output waveguide 6.

At the first transition region 544, the waveguide height and width are reduced, and at the second transition region, 546 the waveguide height and width are increased. In this way, the waveguide dimensions within the ring resonator modulator are smaller than those of the input and output waveguides.

The transmittance spectrum of the ring resonator is shown in FIG. 13 and takes the form of a periodic set of sharp troughs, each trough separated from the two directly adjacent troughs via a wavelength difference equal to the free spectral range (FSR) of the ring resonator. As this transmittance spectrum is the inverse of that for the "dual straight waveguide" embodiment, the ring resonator modulator of FIGS. 12 and 13 will require an opposite drive signal (bias applied across the p-n junction) as compared to the single coupled waveguide version in order to give rise to the same modulation effect.

The transmittance of the resonator in the troughs preferably has a maximum value of between 0.8 and 1, and may be 0.8. As with the previous ring resonator embodiment, modulation is achieved when a bias is applied across the p-n junctions from the electrical circuit connector via the electrodes. This tunes the transmittance spectrum on and off resonance with the wavelength of the (unmodulated) laser which in turn results in the transmitted output signal being turned on 94 and off 95. However, because the transmittance is a trough on resonance, the magnitude of bias change is larger to get the same extinction ratio for the "dual straight waveguide" embodiment An advantage of this embodiment is that there is only one straight waveguide and one discontinuous portion in the p-n junctions around the circumference, meaning the electrode for the p-doped region does not have to cross over a straight waveguide. When metal electrodes cross a waveguide additional optical loss is introduced.

The ring resonator modulator 153 also includes a fine tuning region in the form of a heater (not shown) for thermal tuning. By actively adjusting the voltage across the phase tuning heater pads 58a and 58b, the alignment of the resonant peak of the F-P cavity to the wavelength of the laser can be maintained in the presence of ambient thermal drift.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention. All references referred to above are hereby incorporated by reference.

The invention claimed is:

1. A detector remodulator comprising:
a silicon on insulator (SOI) chip;
a detector coupled to a first input waveguide;
a SiGe or homogeneous Si modulator, on the SOI chip, coupled to a second input waveguide and an output waveguide; and
an electrical circuit connecting the detector to the modulator;
wherein the modulator includes a waveguide including a modulation region at which a semiconductor junction is set across the waveguide of the modulator, the junction comprising a first doped region and a second doped region;
wherein:
the electrical circuit is connected to a first electrical pad on a first side of the modulation region, the first electrical pad forming a contact directly to the first doped region,
the electrical circuit is connected to a second electrical pad on a second side of the modulation region, the second electrical pad forming a contact directly to the second doped region, and
the electrical circuit comprises a signal path from the detector to the modulator, the signal path having a portion in an integrated circuit.

2. The detector remodulator of claim 1, wherein the first input waveguide, the detector, the modulator, the second input waveguide, and output waveguide are arranged within the same horizontal plane as one another.

3. The detector remodulator of claim 1, wherein the semiconductor junction of the modulation region is a p-n junction having a p-doped region and an n-doped region.

4. The detector remodulator of claim 3, wherein the first electrical pad forms a contact directly to the p-doped region of the p-n junction and the second electrical pad forms a contact directly to the n-doped region of the p-n junction.

5. The detector remodulator of claim 1, wherein the semiconductor junction of the modulation region is a p-i-n junction having a p-doped region, an intrinsic region, and an n-doped region.

6. The detector remodulator of claim 5, wherein the first electrical pad forms a contact directly to the p-doped region of the p-i-n junction and the second electrical pad forms a contact directly to the n-doped region of the p-i-n junction.

7. The detector remodulator of claim 1, wherein the modulation region of the modulator is formed from a bulk semiconductor material.

8. The detector remodulator of claim 1, wherein the detector comprises a waveguide portion with a semiconductor junction set horizontally across the waveguide portion.

9. The detector remodulator of claim 8, wherein the semiconductor junction of the detector is a p-i-n junction.

10. The detector remodulator of claim 9, wherein the semiconductor junction of the detector includes an n-i-n, n-p-n or p-i-p junction such that it functions as a phototransistor.

11. The detector remodulator of claim 6, wherein the electrical circuit is connected to a third electrical pad forming a contact directly to the intrinsic region of the p-i-n junction.

12. The detector remodulator of claim 1, wherein the detector is formed from a bulk semiconductor material.

13. The detector remodulator of claim 1, wherein the electrical circuit is monolithic.

14. The detector remodulator of claim 1, wherein the electrical circuit is a stripline circuit.

15. The detector remodulator of claim 1, wherein the modulator is an electro-absorption modulator (EAM).

16. The detector remodulator of claim 1, wherein the modulator is a Mach-Zehnder modulator (MZM).

17. The detector remodulator of claim 16, wherein each arm of the MZM includes a modulation region and a phase shift region in addition to the modulation region; and wherein the phase shift region has a lower speed than the modulation regions.

18. The detector remodulator of claim 1, wherein the modulator is a Fabry-Perot resonator modulator.

19. The detector remodulator of claim 18, wherein the modulator is formed in a single waveguide section by two reflectors in series with one or more modulation regions between the two reflectors.

20. The detector remodulator of claim 19, wherein the reflectors are DBR gratings.

21. The detector remodulator of claim 20, wherein the Fabry-Perot resonator cavity includes a phase shift region in addition to the modulation region.

22. The detector remodulator of claim 21, wherein the phase shift region has a lower speed than the modulation regions.

23. The detector remodulator of claim 1, wherein the modulator is a ring resonator modulator.

24. The detector remodulator of claim 23, wherein the ring resonator modulator comprises a ring-shaped waveguide and a single straight waveguide to couple light both into and out of the ring-shaped waveguide.

25. The detector remodulator of claim 23, wherein the ring resonator comprises a ring-shaped waveguide; a first straight waveguide to couple light into the ring-shaped waveguide; and a second straight waveguide to couple light out of the ring-shaped waveguide.

26. The detector remodulator of claim 1, wherein the electrical circuit includes a variable resistor.

27. The detector remodulator of claim 1, wherein the electrical circuit is surface mounted.

* * * * *